(12) United States Patent
Gotoh et al.

(10) Patent No.: US 6,709,176 B2
(45) Date of Patent: Mar. 23, 2004

(54) PRINTER CONTROLLING DEVICE, PRINTER CONTROLLING METHOD, AND COMPUTER PRODUCT

(75) Inventors: Tetsuya Gotoh, Kanagawa (JP); Hajime Takahashi, Kanagawa (JP); Keiji Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 09/986,596

(22) Filed: Nov. 9, 2001

(65) Prior Publication Data

US 2002/0057455 A1 May 16, 2002

(30) Foreign Application Priority Data

Nov. 10, 2000 (JP) ........................................ 2000-344135

(51) Int. Cl.[7] .................................................. B41J 5/30
(52) U.S. Cl. ........................... 400/61; 400/62; 358/1.15
(58) Field of Search ............................... 400/61, 62, 70, 400/76; 358/1.15, 1.16, 1.2, 1.6

(56) References Cited

U.S. PATENT DOCUMENTS

| | | | | |
|---|---|---|---|---|
| 5,036,361 A | * | 7/1991 | Filion et al. .................. | 399/81 |
| 6,046,816 A | * | 4/2000 | Rawal et al. ............... | 358/1.12 |
| 6,058,277 A | * | 5/2000 | Streefkerk et al. ............ | 399/81 |
| 6,181,436 B1 | * | 1/2001 | Kurachi ....................... | 358/1.15 |
| 6,335,795 B1 | * | 1/2002 | Neuhard et al. ........... | 358/1.15 |
| 6,373,585 B1 | * | 4/2002 | Mastie et al. ............... | 358/1.15 |

FOREIGN PATENT DOCUMENTS

| | | |
|---|---|---|
| JP | 11-78178 | 3/1999 |
| JP | 2000-132354 | 5/2000 |

* cited by examiner

*Primary Examiner*—Stephen R. Funk
*Assistant Examiner*—Minh H. Chau
(74) *Attorney, Agent, or Firm*—Oblon, Spivak, McClelland, Maier & Neustadt, P.C.

(57) ABSTRACT

A schedule view is displayed in a print server. In the schedule view, print-jobs are displayed with rectangular shapes having lengths corresponding to printing time and color (or pattern) corresponding to its state, and the print-jobs are arranged and displayed in the order of prints to which the print-jobs are allocated. It is possible to intuitively grasp relative magnitude of a load of each printer by the length of a job graph, and an absolute amount of the load of each printer converted into a printing time by a displayed time scale. In addition to this, details of a job which is being processed, details of a selected job, and a state of each printer are also displayed.

39 Claims, 19 Drawing Sheets

FIG.4

| ITEM ID | DATA TYPE | SIZE (BYTE) | DESCRIPTION |
|---|---|---|---|
| JID | TEXT | 14 | JOB ID (ID IS "J + SEVEN-DIGIT NUMERICAL VALUE") |
| UID | TEXT | 8 | USER'S ID |
| NUM | INTEGER | 2 | THE NUMBER OF SHEETS (1 TO 9999) |
| SIDE | BYTE | 1 | TWO-SIDED |
| PCOL | BYTE | 1 | PRINT COLOR |
| PAGE | INTEGER | 2 | THE NUMBER OF PAGES OF DOCUMENT (1 TO 9999) |
| SIZE | TEXT | 2 | PAPER SIZE |
| SCOL | TEXT | 2 | PAPER COLOR |
| QUAL | TEXT | 2 | PAPER QUALITY |
| SPCL | TEXT | 2 | SPECIAL PAPER |
| HCOL | TEXT | 2 | FRONT PAPER COLOR |
| STPL | TEXT | 2 | STAPLE |
| PLCE | TEXT | 2 | PLACE TO BIND |
| WAY | TEXT | 2 | BINDING METHOD |
| HOLE | TEXT | 2 | PUNCHING |
| SCDL | BYTE | 1 | SCHEDULE |
| SDATE | DATE/TIME | 8 | OUTPUT DATE AND TIME (EFFECTIVE ONLY WHEN DATE IS DESIGNATED) |
| COMM | TEXT | 40 | COMMENT |
| SAVE | BYTE | 1 | DESIGNATION OF SAVE OF DOCUMENT |
| LONG | DATE/TIME | 8 | TIME PERIOD OF SAVING |
| YEAR | INTEGER | 2 | YEARS OF SAVING |
| REPE | BYTE | 1 | REPEAT CLASSIFICATION |
| OJID | TEXT | 14 | PARENT JOB ID |
| RPDL | TEXT | 35 | FILE NAME (RPDL) |
| FILE | TEXT | 35 | FILE NAME |
| MID | TEXT | 14 | ESTIMATION ID |
| STT | DATE/TIME | 8 | START OF PROCESSING |
| END | DATE/TIME | 8 | COMPLETION OF PROCESSING |
| DATE | DATE/TIME | 8 | REGISTERED DATE AND TIME |
| PERI | INTEGER | 2 | PRECEDENCE |
| UFLG | TEXT | 2 | USER JOB STATE FLAG |
| KFLG | TEXT | 2 | MANAGER JOB STATE FLAG |
| DOCID | TEXT | 45 | DOCUMENT ID OF LIFISA |
| PNAME | TEXT | 100 | PRINTER NAME |
| OPAGE | INTEGER | 2 | THE NUMBER OF OUTPUT PAGES |
| ECPY | INTEGER | 2 | THE NUMBER OF OUTPUT SHEETS |
| DIVN | INTEGER | 2 | THE NUMBER OF DIVIDED JOBS |
| AMNY | LONG INTEGER | 4 | PRINTING COST (TOTAL) |
| MEANS | BYTE | 1 | OUTPUT STYLE |
| KCOMM | TEXT | 128 | MANAGER COMMENT |

\*NOTES  '1' (49) PARALLEL PRINT
        '2' (50) COLLECTIVE PRINT (NORMAL)
        '3' (51) DEPUTY PRINT

FIG.5

| ITEM ID | DATA TYPE | SIZE (BYTE) | DESCRIPTION |
|---|---|---|---|
| JID | TEXT | 14 | JOB ID (EIGHT-DIGIT) + SMALL JOB ID (SIX-DIGIT) |
| PRNT | TEXT | 50 | PRINTER NAME |
| STT | DATETIME | 8 | PRINT-START IMPOSED DATE |
| END | DATETIME | 8 | PRINT-COMPLETION IMPOSED DATE |
| SNO | INTEGER | 2 | STARTING PAGE NUMBER |
| NUM | INTEGER | 2 | THE NUMBER OF OUTPUT SHEETS |
| KFLG | TEXT | 2 | MANAGER JOB STATE FLAG *NOTE |
| TIME | INTEGER | 2 | PRINTING TIME |

\*NOTES
"01" PRINT STANDBY
"02" PRINTING
"03" STOPPING
"04" NOT ALLOCATED TO PRINTER (PENDING)
"05" PRINT COMPLETION
"06" PRINT CANCEL
"07" BOUND
"08" SENT
"09" COMPLETION OF PROCESSING
"99" PRINT ERROR

FIG.6

| GROUP NAME | PRINTER NAME | STATE | IP ADDRESS | OPERATION AT THE TIME OF RECEPTION | OPERATION AT THE TIME OF COMPLETION | DEPUTY PRINT | PARALLEL PRINT | COLOR PAGE |
|---|---|---|---|---|---|---|---|---|
| PRINTER A | PRINTER A1 | READY | 166.192.195.131 | MANUAL AT THE TIME OF INPUT | DISPLAY COMPLETION SCREEN | MANUAL | 30 SHEETS OR MORE | NOT USED |
|  | PRINTER A2 | READY | 166.192.195.132 |  |  |  |  |  |
|  | PRINTER A3 | WARM UP | 166.192.195.133 |  |  |  |  |  |
|  | PRINTER A4 | PAPER JAMMING | 166.192.195.134 |  |  |  |  |  |
| PRINTER B | PRINTER B1 | REPLENISH TONER | 166.192.195.141 | MANUAL AT THE TIME OF INPUT | DISPLAY COMPLETION SCREEN | AUTOMATIC | 20 SHEETS OR MORE | USED |
|  | PRINTER B2 | READY | 166.192.195.142 |  |  |  |  |  |
|  | PRINTER B3 | READY | 166.192.195.143 |  |  |  |  |  |
| ... | ... | ... | ... | ... | ... | ... | ... | ... |

FIG.8

GROUP FORMING

DESIGNATE GROUP NAME AND PRINTER TO BE MANAGED

NAME OF GROUP (G)

PRINTER TO BE MANAGED (M)

| PRINTER NAME | IP ADDRESS | STATE | INSTALLATION PLACE | COMMENT |
|---|---|---|---|---|
|  |  |  |  |  |
|  |  |  |  |  |
|  |  |  |  |  |
|  |  |  |  |  |

PRECEDENCE ↑ ↓

EDIT (S)

801 — ADD ↑ (C)   RELEASE ↓ (D)

ADDABLE PRINTER (K)

| PRINTER NAME | IP ADDRESS |
|---|---|
| PRINTER B1 | 166.192.195.141 |
| PRINTER B2 | 166.192.195.142 |
| PRINTER B3 | 166.192.195.143 |
|  |  |

DIRECTLY DESIGNATE BY IP ADDRESS (I)

< RETURN (B)   NEXT (N) >   CANCEL   HELP (H)

GROUP FORMING  ☒

● SET OPERATIONS WHEN JOB IS RECEIVED OR PRINT IS COMPLETED

─ OPERATIONS WHEN JOB IS RECEIVED ─
- ⦿ ALLOCATE JOB ON JOB RECEIVING SCREEN (V)
- ○ ALLOCATE JOB AUTOMATICALLY (K)
- ○ ALLOCATE JOB IN LIST (L)

─ OPERATIONS WHEN PRINT IS COMPLETED ─
- ☑ DISPLAY PRINT COMPLETION SCREEN (E)
- ☐ DELETE JOB AUTOMATICALLY (D)

● SET DEPUTY/PARALLEL PRINT

─ ☑ DEPUTY PRINT (T) ─
- ○ MANUAL DEPUTY PRINT (M)
- ⦿ AUTOMATIC DEPUTY PRINT (U)

─ ☑ PARALLEL PRINT (R) ─
THE NUMBER OF PRINTS (P)
WHEN PRINTING ON  20  ⇅
OR MORE SHEETS

● SET COVER PAGE

☑ COVER PAGE IS USED (N)

[ < RETURN (B) ]  [ COMPLETE ]  [ CANCEL ]  [ HELP (H) ]

| RECEPTION OF JOB | | | ☒ |
|---|---|---|---|

RECEIVING TIME        2000/02/15 15:48
NAME OF DOCUMENT      ××RECEIVED DOCUMENT
THE NUMBER OF COPIES  300 COPIES

A NEW JOB WAS INPUT.
ALLOCATE PRINTER JOB.

THE NUMBER OF UNALLOCATED COPIES : 240

| PRINTER NAME | STATE | THE NUMBER OF ALLOCATED COPIES |
|---|---|---|
| ▚ PRINTER A1 | STOP | 30 |
| ⏻ PRINTER A2 | OPERATING | 30 |
|  |  |  |
|  |  |  |

[ AVERAGING (V) ]    [ RELEASE ALLOCATION (S) ]

[ < RETURN (B) ]  [ NEXT (N) > ]  [ CANCEL ]  [ HELP (H) ]
                        1001         1002

FIG.11

| RECEPTION OF JOB | ☒ |

RECEIVING TIME    2000/02/15 15:48
NAME OF DOCUMENT  ××RECEIVED DOCUMENT
THE NUMBER OF COPIES  300 COPIES

SET CONDITION OF JOB

┌─PRECEDENCE (P)──────────────────────┐
│  [3]  LOW ══════════╪══════ HIGH     │
└──────────────────────────────────────┘

┌─COVER PAGE──────────────────────────┐
│  COVER PAGE IS USED                  │
└──────────────────────────────────────┘

[< RETURN (B)]  [COMPLETE]  [CANCEL]  [HELP (H)]
                    1101       1102

| | |
|---|---|
| ▨ | JOB WHICH IS BEING PRINTED |
| ☐ | COLLECTIVE PRINT JOB & UNALLOCATED JOB |
| ☰ | PARALLEL PRINT JOB |
| ∥∥ | DEPUTY PRINT JOB |
| ▦ | PENDING JOB |
| ■ | STOPPED JOB |
| ▩ | ERROR JOB |

FIG.21

| PRINT-JOB LIST | | | | | | |
|---|---|---|---|---|---|---|
| STATE | JOB ID | NAME OF DOCUMENT | USER'S NAME | OUTPUT PRINTER | FILE SIZE | NUMBER OF COPIES |
| BEING PRINTED | J0000023 | REUNION MEMBER LIST | XX UNIVERSITY | ORANGE | 120k | 1520 |
| ON STANDBY | J0000049 | SEMINAR TEXT | (CO. LTD.) YY | MELON | 96k | 100 |
| ON STANDBY | J0000102 | OPERATION MANUAL | (CO. LTD.) ZZ | ORANGE | 532k | 2250 |

PRINTER CONTROLLING DEVICE, PRINTER CONTROLLING METHOD, AND COMPUTER PRODUCT

FIELD OF THE INVENTION

The present invention relates to a printer controlling device which displays a load state of at least one printer connected through a network, a printer controlling method, and a computer program for allowing a computer to execute the method is stored.

BACKGROUND OF THE INVENTION

Conventionally there exists a service called "copy service", "printing service" and the like in which a designated document requested by a customer (mainly, company) is printed by a designated number of sheets, and the printed sheets are bound in a designated method and supplied.

A printing request is carried out in such a manner that a draft recorded in a paper medium or electronic medium (FD, MO, CD-ROM or the like) and a printing instruction in which the number of copies of the draft, a binding method, a delivery date and the like are written are mailed to a dealer who provides the above-described service (this is called "new order"). When a draft which was also previously requested to be printed is re-requested to be printed, the draft which is in storage on the side of the dealer may be designated and the number of copies and the like may informed on telephone (this is called "repeated order").

On the side of the dealer, processing procedure or processing time periods are determined by instinct or experience of a person in charge of this job (or task) while taking into account the number of prints, delivery date, limit of personal or physical resource and the like for each of requests received from an indefinite number of customers. According to this schedule, the designated draft is copied by a copier, or the draft is printed by a printer connected to a personal computer, and finally the copied or printed sheets are confirmed and collated and delivered to the customer.

Whereas, there is realized a system in which the printing request from a customer is received online through Internet, and scheduling or print out are automatically carried out using a print server and a plurality of printers connected to the print server.

For example, a customer accesses a Web page provided by a dealer from a personal computer of his own company, the customer inputs necessary information such as the number of copies on a print requesting form (job ticket), and the form is sent together with document data to be printed, and the printing of the document can be ordered.

The dealer received this order selects a printer that can complete already allocated jobs fastest from various printers connected to the server through LAN. Then, the dealer adds this new print-job to the last one of the print-waiting jobs.

If the new job had short delivery date and could not wait for completion of other jobs, the new job may exceptionally be processed as an interruption before the other waiting jobs. More efficient job scheduling system is also realized in which a large job is divided into some of small jobs and they are processed by a plurality of printers (concurrent printing), or a job is divided into small jobs such the loads of printers becomes equal to each other (averaging printing), or a job is distributed such that cost is minimized (optimizing printing).

However, in the above conventional art, there is a problem that it is difficult to grasp the total volume of loads of the entire system or distribution state of loads to printers, including how much jobs the entire system has, or the amount of jobs of each printer, or which printer does not have allocated jobs.

FIG. 21 is an explanatory view showing one example of a print-job list window displayed on a conventional print server. Since time required for processing each job is found only roughly from file size or the number of copies, an item of printing time calculated by any calculation equation may be provided in addition to them (or instead of them). However, even with this item, the printing time of each job is only indicated clearly, total printing time required for processing all of jobs distributed to the printers, and the total printing time required for processing all of jobs of the entire system must be obtained by another calculation.

In order to estimate when a job is processed by a printer to which the job is allocated, printing time of previous jobs must be summed up. Therefore, it is complicate to check whether each job can be processed in time point by point. In association with unclearness of processing time period of job, it is difficult to find a total volume of jobs processed for a given time period and a total volume of jobs of each printer.

SUMMARY OF THE INVENTION

It is an object of the present invention to provide a printer controlling device which displays a load state of at least one printer connected through a network, a printer controlling method, and a computer program for allowing a computer to execute the method is stored, capable of displaying a load state at various points in time of each printer in a system graphically, in real time and easily.

The printer controlling device according to one aspect of the present invention is which displays a load state of at least one printer connected through a network. This printer controlling device comprises an allocating unit which allocates a print-job to any of the printers, a calculating unit which calculates time required for the printer to which the job was allocated by the allocating unit which processes the print-job, and a display unit which displays the print-job by a predetermined shape having a length which is proportional to the time calculated by the calculating unit, and which arranges the predetermined shapes corresponding to all print-jobs allocated to the printer by the allocating unit an not completed at a constant distance in a horizontal direction or a vertical direction in association with individual printers.

According to the above-mentioned aspect, an accumulation state of a job to each printer is displayed in a form of the job graph comprising all jobs accumulated in the printer.

The printer controlling method according to another aspect of the present invention is a method of displaying a load state of at least one printer connected through a network. This method comprises: an allocating step of allocating a print-job to any of the printers, a calculating step of calculating time required for a printer to which the print-job is allocated by the allocating step of processing the print-job, and a display step of displaying the print-job with a predetermined shape having a length which is proportional to time calculated by the calculating step, the display step arranging and displaying the predetermined shapes respectively corresponding to all print-jobs which are allocated to the printers by the allocating step but are not yet completed, in association with individual printers.

According to the above-mentioned aspect, an accumulation state of a job to each printer is displayed in a form of the job graph comprising all jobs accumulated in the printer.

The computer program according to still another aspect of the present invention for allowing a computer to execute the method according to the present invention. A computer can read the computer program stored in this computer-readable storage medium, and execute the method easily and automatically.

Other objects and features of this invention will become apparent from the following description with reference to the accompanying drawings.

BRIEF DESCRIPTION OF THE DRAWINGS

FIG. 4 is an explanatory view showing one example of items of a print-job table 303a of the embodiment of the invention, FIG. 5 is an explanatory view showing one example of items of a print schedule table 303b of the embodiment of the invention, FIG. 6 is a schematic explanatory view showing one example of items of a printer table 303c of the embodiment of the invention, FIG. 8 is an explanatory view showing one example of a printer setting dialog of the embodiment of the invention, FIG. 9 is an explanatory view showing one example of a printer setting dialog of the embodiment of the invention, FIG. 10 is an explanatory view showing one example of a printer allocating dialog of the embodiment of the invention, FIG. 11 is an explanatory view showing one example of a printer allocating dialog of the embodiment of the invention, FIG. 21 is an explanatory view showing one example of a print-job list window displayed in the conventional art.

DETAILED DESCRIPTION

Figure 1:
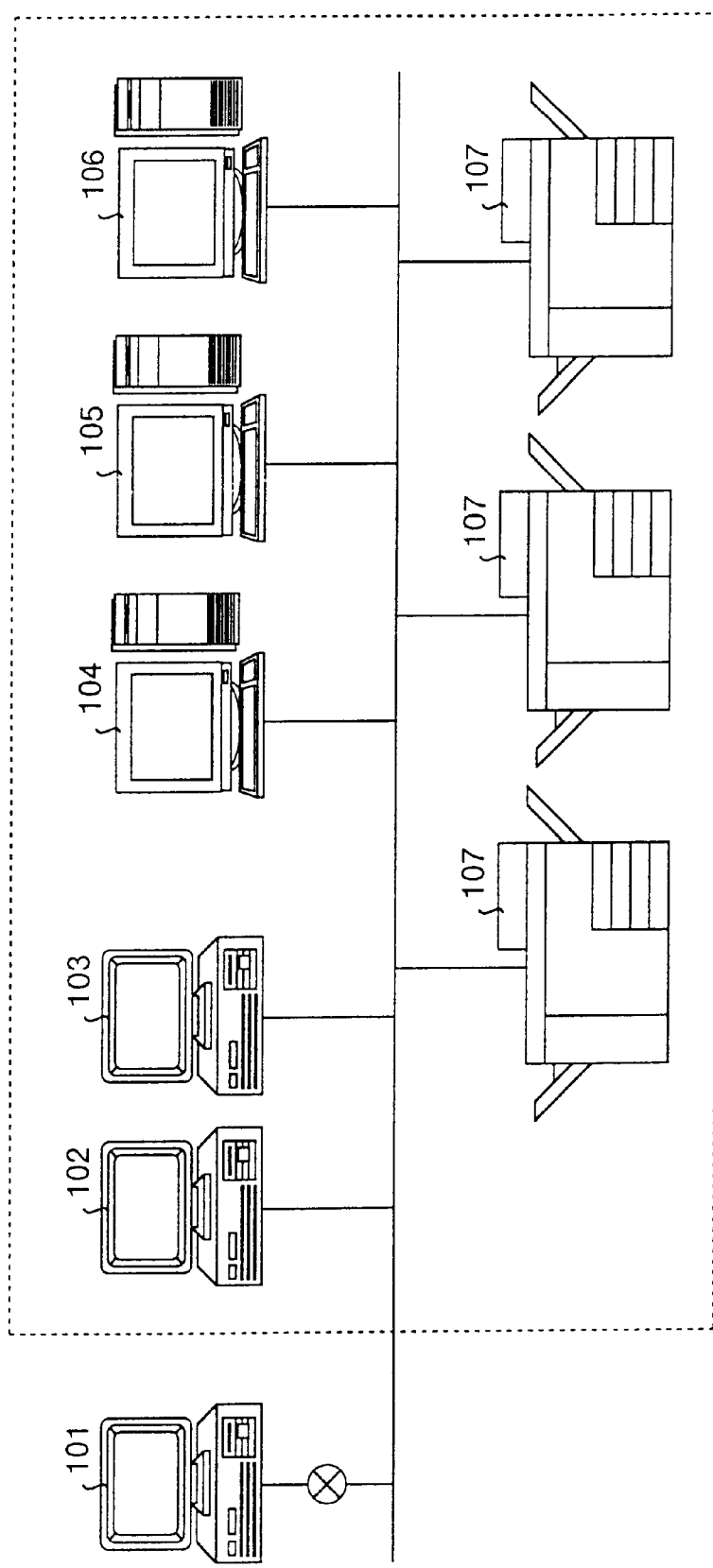
FIG. 1 is an explanatory view showing a system construction of a printing system including a printer controlling device according to an embodiment of the present invention.

Embodiments of a printer controlling device which displays a load state of at least one printer connected through a network, a printer controlling method, and a computer program for allowing a computer to execute the method is stored will be explained in detail with reference to the accompanying drawings. System construction of a printing system:

First, the entire printing system including a printer controlling device of an embodiment of the invention will be explained. FIG. 1 is an explanatory view showing the system construction of the printing system including a printer controlling device according to the embodiment of the present invention.

In FIG. 1, a reference number 101 represents a user client, and is a computer used by a customer for ordering printing operation to a dealer. A Web browser is started from this computer, and if a print-requesting Web page on a later-described WWW server 104 is accessed, a document to be printed and a job ticket in which its printing condition is written can be sent.

In FIG. 1, the printing system comprises later-described a reception client 102, a managing client 103, a WWW server 104, a print server 105, a document managing server 106 and a plurality of printers 107. The computer and the printers are connected to each other through LANs.

A reference number 102 represents a reception client, and is a computer used by a person in charge of the dealer who received the order by means of telephone or mail in stead of a customer who does not have a computer or network. The person uses the reception client 102 for inputting a document to be printed and a job ticket. The reception client 102 has the same function as that of the user client 101.

A reference number 103 represents a managing client, and is a computer used by a person in charge of the dealer for managing the printing operation ordered from a customer. If a print-managing Web page on the WWW server 104 is accessed from the Web browser, the document to be printed and the job ticket can be registered, retrieved, deleted and managed.

The reference number 104 represents the WWW server, and is a computer for supplying three kinds of Web pages, i.e., a print-requesting Web page, a print-managing Web page and a document managing server Web page, as well as Web applications for the Web pages. If the WWW server 104 received a new print order from the user client 101 or the reception client 102 through the above Web page, the WWW server 104 transfers the order to the print server 105 which will be described later.

The print server 105 controls the later-described printer 107 to allow the latter to process a print-job sent from the user client 101 or the reception client 102. Further, as will be described later, the print server 105 displays, on a screen, accumulation state, a progress state, an operating status of each printer in real time and graphically.

A reference number 106 represents a document managing server, and is a computer for accumulating and managing a document to be printed and a job ticket. The document managing server 106 receives acquisition request from the print server 105, and retrieves and sends a document to be held and a job ticket.

The reception client 102, the managing client 103, the WWW server 104, the print server 105 and the document managing server 106 may not always individual computers, and one computer may have all of the above functions.

Each of the printers 107 forms a paper image from a document to be printed in accordance with control of the print server 105, and prints the imaged document on a predetermined sheet of paper in accordance the designated condition.

Figure 2:
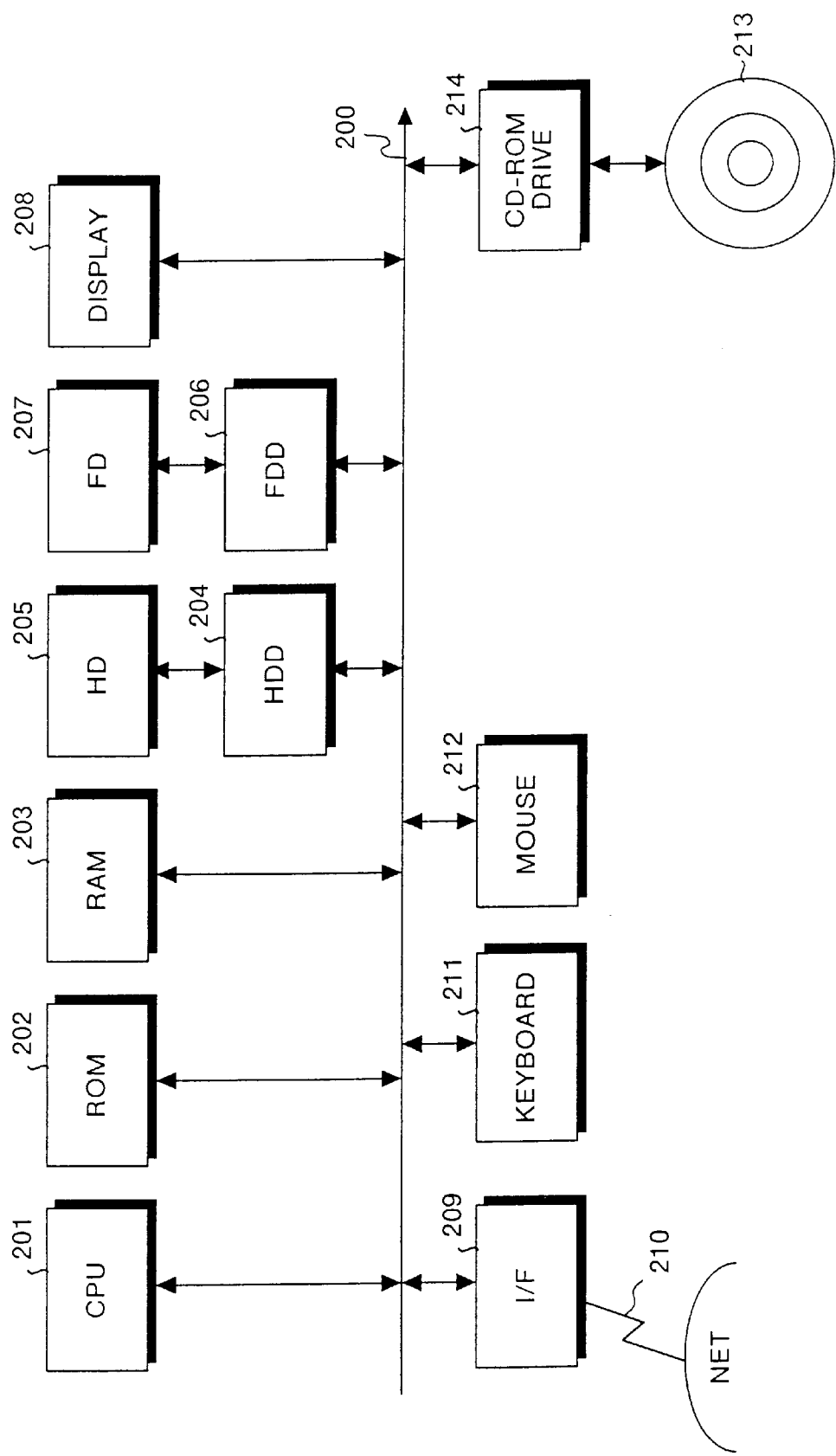
FIG. 2 is an explanatory view showing a hardware construction of a print server 105 of the embodiment of the invention.

A hardware construction of the printer controlling device (concretely, print server 105) of the embodiment of the invention will be explained. FIG. 2 is an explanatory view showing a hardware construction of the print server 105 of the embodiment of the invention.

In FIG. 2, a reference number 201 represents a CPU for controlling operation of the entire apparatus. A reference number 202 represents a ROM in which a basic input/output program is stored. A reference number 203 represents a RAM used as a work area of the CPU 201.

A reference number 204 represents a HDD (hard disk drive) which controls read/write of data with respect to a HD (hard disk) 205, and the reference number 205 represents the HD storing data written in accordance with control of the HDD 204. A reference number 206 represents a FDD (floppy disk drive) which controls read/write of a FD (floppy disk) 207. The reference number 207 represents is the FD as one example of a detachable storage medium for storing data written in accordance with control of the FDD 206.

A display 208 displays a cursor, a window and various data such as characters and images. A network board 209 is connected to a network NET such as LAN through a network cable 210 such as a twisted pair wire, and functions as an interface between the network NET and the CPU 201.

A keyboard 211 has a plurality of keys for inputting characters, numerical values, various instructions and the like. A mouse 212 is used for selecting and executing various instructions, selecting subject to be processed, and moving the cursor. A CD-ROM 213 is a detachable storage medium. A CD-ROM drive 214 controls read of data with respect to the CD-ROM 213. A bus or cable 200 is used for connecting the above elements.

Figure 3:
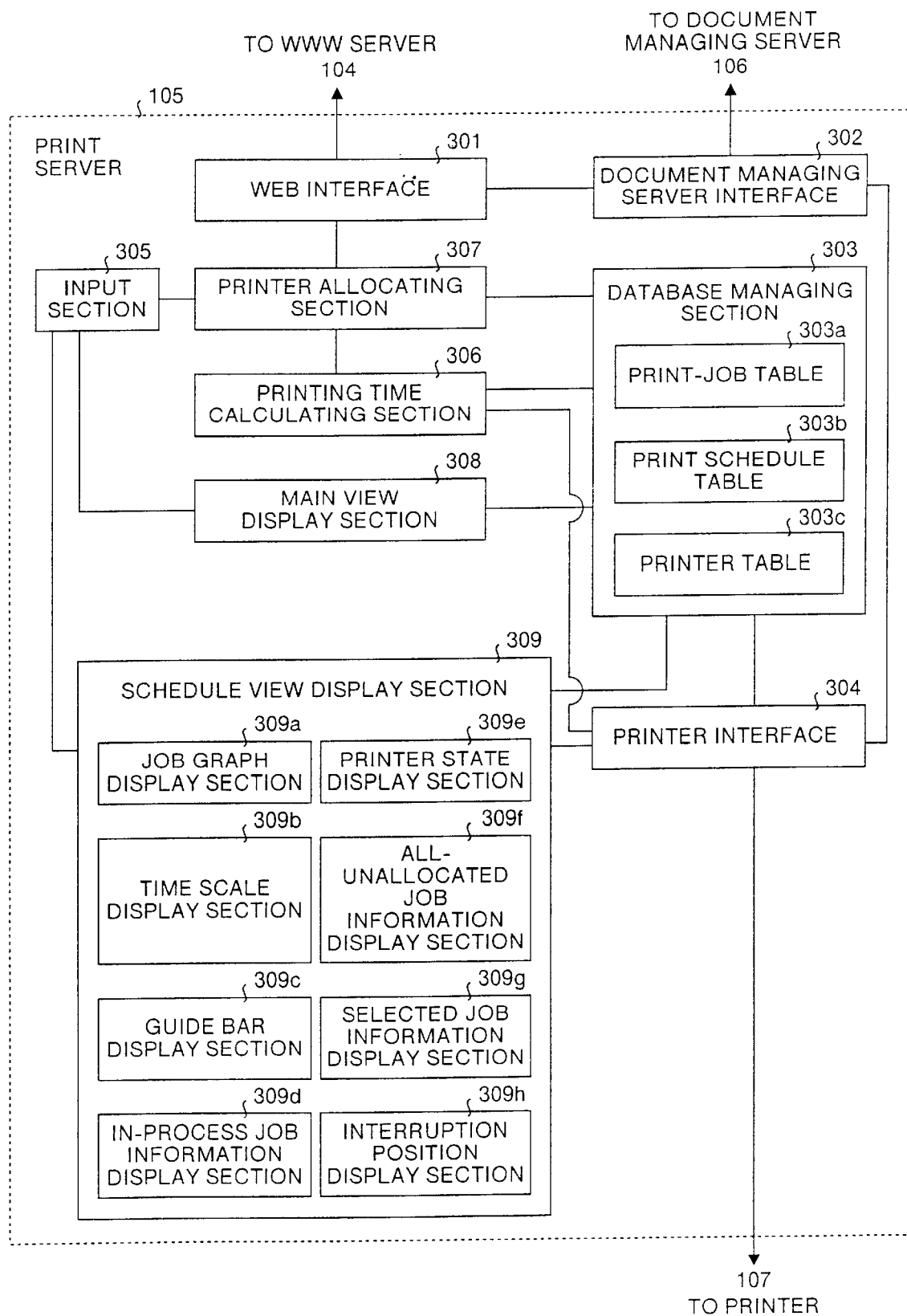
FIG. 3 is an explanatory view functionally showing the construction of the print server 105 of the embodiment of the invention.

Next, a functional construction of the printer controlling device (print server 105) of the embodiment of the invention will be explained. FIG. 3 is an explanatory view functionally showing the construction of the print server 105 of the embodiment. In FIG. 3, only minimum functions required for explaining the present invention are illustrated, and other portions are omitted.

As shown in FIG. 3, a Web interface 301 controls communication with the WWW server 104, and receives various requests such as a print-order, i.e., a register-request of a print-job transferred from the user client 101 or the like through the WWW server 104.

As requests to be received, in addition to the register of a print-job, there are detail confirmation and state confirmation of print-job which have already been registered and a list display of print-jobs registered in the past. Therefore, the Web interface 301 first judges which request an input request is. If the input request is register of a print-job, a document to be printed and its job ticket are output to the document managing server 106 through the document managing server interface 302, and to a later-described printer allocating section 307 (when a printer allocation at the time of input using a dialog in later-described FIG. 9 is selected).

The document managing server interface 302 controls communication with the document managing server 106, and sends register request of a document to be printed and a job ticket input from the Web interface 301 to the document managing server 106, or sends acquisition request of already registered document and job ticket and receives the document and the job ticket.

A database managing section 303 receives orders from a later-described printer interface 304, a printing time calculating section 306, and a printer allocating section 307, and writes the orders into a print-job table 303a, a print schedule table 303b and a printer table 303c.

The print-job table 303a is a table for holding details of contents of a print-job input from the user client 101 or the like. FIG. 4 is an explanatory view showing one example of items of print-job table 303a. In the print-job table 303a, various printing conditions such as the number of copies ("NUM" in FIG. 4) and the number of printing pages ("OPAGE" in FIG. 4) are registered in association with job IDs.

The print schedule table 303b is a table for holding printer slated to process, a current state of each job registered in the print-job table 303a. FIG. 5 is an explanatory view showing one example of items of print schedule table 303b. In the print schedule table 303b, a printer slanted to process ("PRNT" in FIG. 5), a current state ("KFLG" in FIG. 5), printing time ("TIME" in FIG. 5) and the like are registered in association with job IDs.

The printer table 303c is a table for all the printers 107 managed by the print server 105. The table holds a group, a scheduling system, property and a current state of each printer in the group. FIG. 6 is a schematic explanatory view showing one example of items of the printer table 303c. In FIG. 6, a symbol "*" represents a group selected by an inputting section 305 as will be described later, and accumulation states of jobs for printers in this group are collectively displayed in a later-described schedule view.

Among the items of the printer table 303c shown in FIG. 6, contents of "state" item are temporarily rewritten by notice from the printer interface 304 as will be described later. Contents other than that of the above item are set by dialogs shown in FIGS. 7 to 9.

Figure 7:
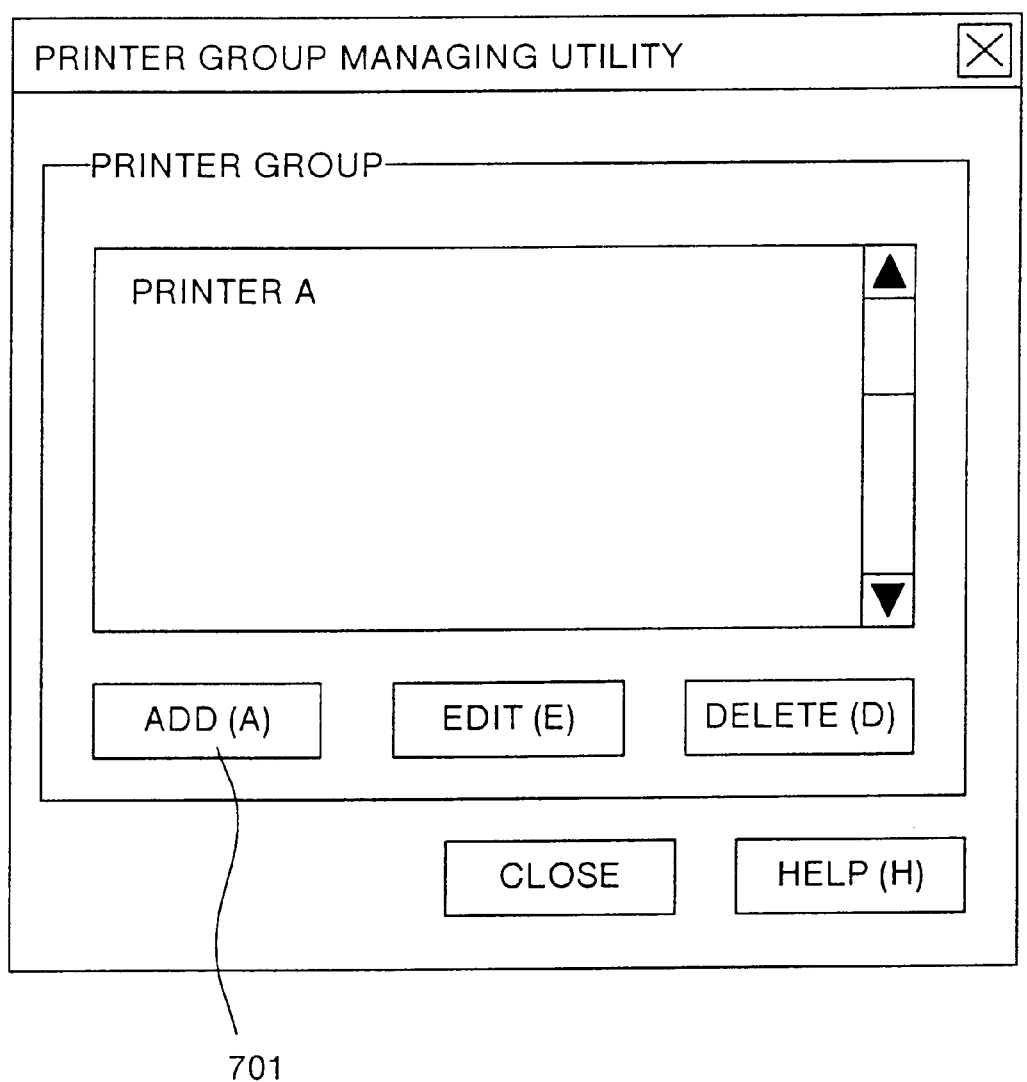
FIG. 7 is an explanatory view showing one example of a printer setting dialog of the embodiment of the invention.

In the dialog shown in FIG. 7, if an adding button 701 is pushed, a dialog shown in FIG. 8 is displayed, and an arbitrary group name such as "Printer B" is input for example. If a desired printer is selected from printers which can be added and an adding button 801 is pushed, the selected printer is added to printers managed by "Printer B" group. If a next button 802 is pushed, a dialog shown in FIG. 9 is displayed, and a scheduling system and the like of the added group are set.

In "operation of receiving time" item of the dialog shown in FIG. 9, any of the following schedule systems is selected: (a) a later-described dialog in FIG. 10 is displayed to allow an operator to manually allocate a printer for a new job simultaneously with input of the new job, (b) the printer is automatically allocated by the later-described printer allocating section 307 simultaneously with input of the new job, and (c) the printer is not allocated when the new job is input, and the operator is allowed to manually allocate the printer in the later-described main view or the schedule view. Here, it is assumed that (a) is selected for the "Printer B" group and "Printer A" group as shown.

In "parallel printing" item in dialog shown in FIG. 9, when the number of copies of the jobs exceeds a threshold value, it is determined in the dialog shown in FIG. 10 to be mentioned below whether the job is divided and distributed to a plurality of printers at the default, and if it is determined to divide the job, the threshold value is set. If a complete button 901 is pushed, the set contents in dialogs in FIGS. 8 and 9 are written in the printer table 303c by the database managing section 303.

The printer interface 304 controls the communication with the printers 107, and whenever the completion of a job is informed from any of the printers, the database managing section 303 is requested to retrieve a next job allocated to that printer from the print schedule table 303b, and if the next job was found, details of that job held in the print-job table 303a is returned.

A name of a document to be printed (or information capable of specifying that document such as ID) is extracted from the received job details, and data of that document is obtained through the document managing server interface 302. Necessary information such as data of the document to be printed and the number of copies is sent to the printer 107 designated by the print schedule table 303b, and the job is processed.

The printer interface 304 receives the states sent from the printers at constant intervals. The printer interface 304 requests the database managing section 303 to rewrite the "state" item of the printer table 303c into a new state. States of jobs are found from the states of the printers, the database managing section 303 is requested to renew the states of the jobs held in the print schedule table 303b.

The inputting section 305 inputs various instructions such as selection instructions of a job or a printer displayed in the later-described schedule view, switching instructions of the printer group, allocation instructions of printers, and interruption instructions of job. The inputting section 305 corresponds to "designating unit" in claims, and a portion of process carried out by the inputting section 305 corresponds to "designating step" in claims.

The printing time calculating section 306 calculates, when requested from the later-described printer allocating section 307, time expected to be required for processing individual input job, i.e., printing time using a printing speed of a printer to which the job is allocated, in accordance with the following equation:

printing time (min)=60(min)×the number of copies×the number of printing pages/printing speed of printer (ppm(prints per minute)).

When printing time of a job which is not allocated to a printer is to be calculated, an average value of printing speeds of all managed printers is used as the printing speed of the printer.

The printing time informed the printer allocating section 307 from the printing time calculating section 306 is written into the "printing time" item of the print schedule table 303b by the database managing section 303 requested from the printer allocating section 307. Whenever a constant time is elapsed, the printing time calculating section 306 requests the database managing section 303 to read the printing time which is being printed from the print schedule table 303b, and its value is re-calculated.

An equation in that case is, for example, as follows:

printing time (min)={60(min)×the number of copies×the number of printing pages/printing speed of printer (cpm)}−(60(min)× the number of printed sheets(=the number of already printed sheets)/printing speed of printer (cpm)}.

The database managing section 303 is requested to rewrite the re-calculated printing time into the print schedule table 303b.

As apparent from the above description, the printing time that is calculated and re-calculated by the printing time calculating section 306 and held by the print schedule table 303b is residue time expected to be required from the current time in the strict sense, and the printing time is reduced as the job is processed and when the job is completed, the printing time becomes zero.

The printing time calculating section 306 corresponds to "calculating unit" and "second calculating unit" in claims, and processing carried out by the printing time calculating section 306 corresponds to "calculating step" and "second calculating step".

When (a) is set in the "operation of receiving time" item of the dialog shown in FIG. 9 as described above, the printer allocating section 307 displays a dialog as shown in FIG. 10 simultaneously with input of a new job from the Web interface 301. In this dialog, a printer to which the new job is to be allocated, and the number of allocation sections to the printers are set, and if a next button 1001 is pushed, a dialog shown in FIG. 11 is displayed.

In this dialog, precedence of jobs is set, and if a completion button 1101 is pushed, a job ID (serial number) is given to the new job. At that time, if the job has been divided and distributed to a plurality of printers in the dialog in FIG. 10, i.e., a parallel printing has been instructed, a job ID is given to a parent job before divided, and job IDs in which a serial number particular to the small job is added to the job ID of the parent job is given to each of the small jobs after division.

The printer allocating section 307 requests the printing time calculating section 306 to calculate the printing time of each job, and outputs the printing time, the job ID, contents set in the dialogs in FIGS. 10 and 11, and a job ticket received from the Web interface 301 to the database managing section 303.

In the database managing section 303, necessary information is extracted from the input information, and the extracted information is written into each item of the print-job table 303a and the print schedule table 303b. In the print-job table 303a, a record is formed in unit requested from the customer in the print-job table 303a, i.e., in unit of parent job, and a record is formed in the print schedule table 303b in a unit actually processed by the printer, i.e., in a unit of the small job.

If a cancel button 1002 in the dialog in FIG. 10 or a cancel button 1102 in the dialog in FIG. 11 is pushed, the printer allocating section 307 outputs only the job ID, the printing time and the job ticket received from the Web interface 301 to the database managing section 303. Thus, the "PRNT" item in the print schedule table 303b stays blank.

A job in which at least a job ID is written in the print-job table 303a and the print schedule table 303b but a printer is not determined is called "printer-unallocated" or "unallocated" job hereinafter.

The printer allocating section 307 corresponds to "allocating unit" in claims, and processing carried out by the printer allocating section 307 corresponds to "allocating step" in claims.

Figure 12:
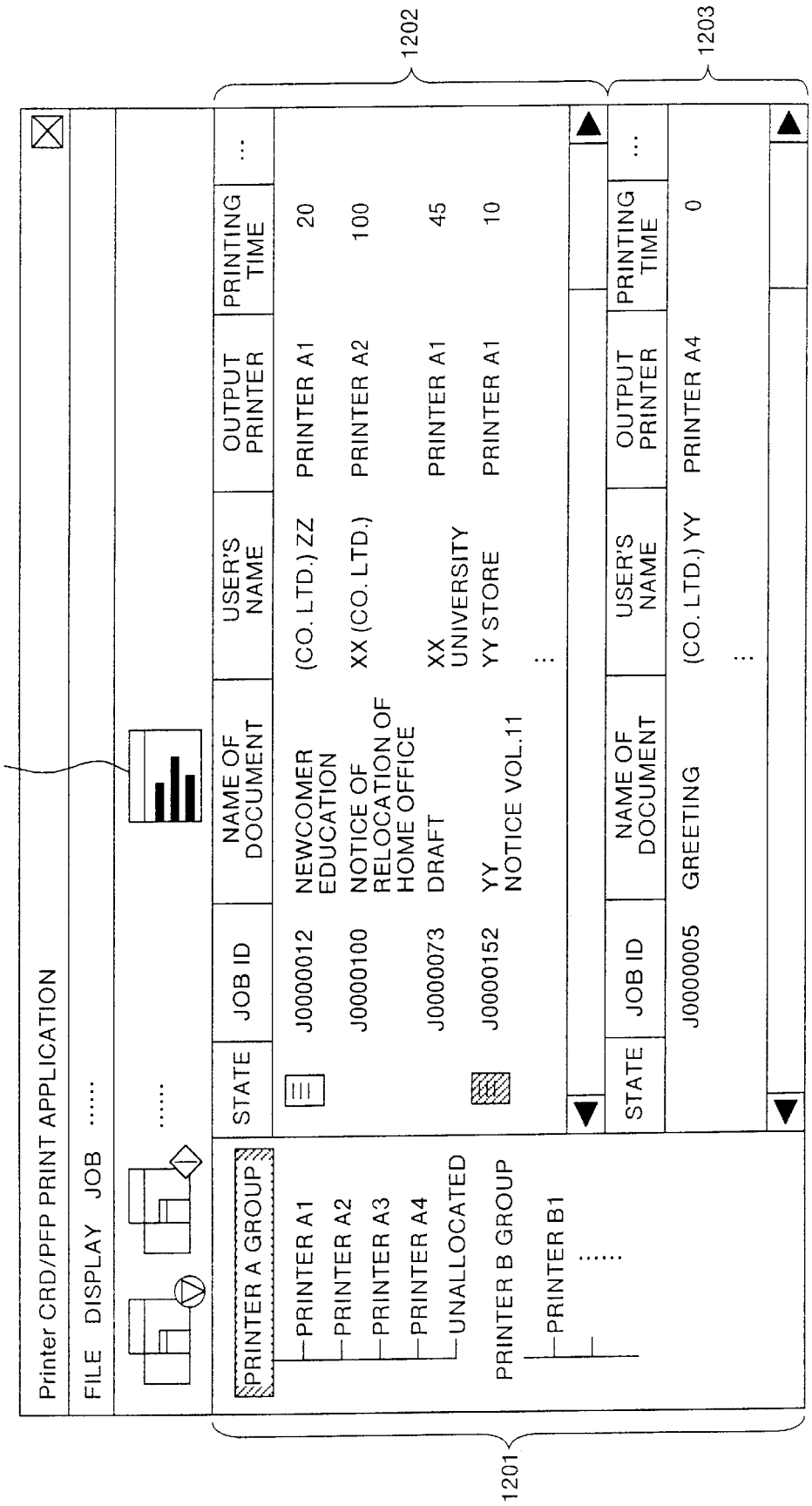
FIG. 12 is an explanatory view showing one example of a main view of the embodiment of the invention.

A main view display section 308 reads out necessary information from each table of the database managing section 303, and displays a main view shown in FIG. 12. In a window shown in FIG. 12, an interior thereof is roughly divided into three. All the printers managed by the print server are displayed in a left region 1201 in a tree structure.

Jobs which are not completed but scheduled a printer selected here or all printers in a selected group are listed in a right upper region 1202. Jobs which have already been completed in the printer are listed in a right lower region 1203.

This window is basically similar to a conventional job list window shown in FIG. 21. Thus, it is difficult, in some cases, to find which printer in a group has how much load, or when a job allocated to the printer is completed. Thereupon, if a schedule view icon 1204 is pushed in the main view, a schedule view showing the above information in an easy manner is displayed instead of the above window.

A schedule view display section 309 comprises a job graph display section 309a, a time scale display section 309b, a guide bar display section 309c, an in-process job information display section 309d, a printer state display section 309e, all-unallocated job information display section 309f, a selected job information display section 309g, and a interruption position display section 309h.

Figure 13:
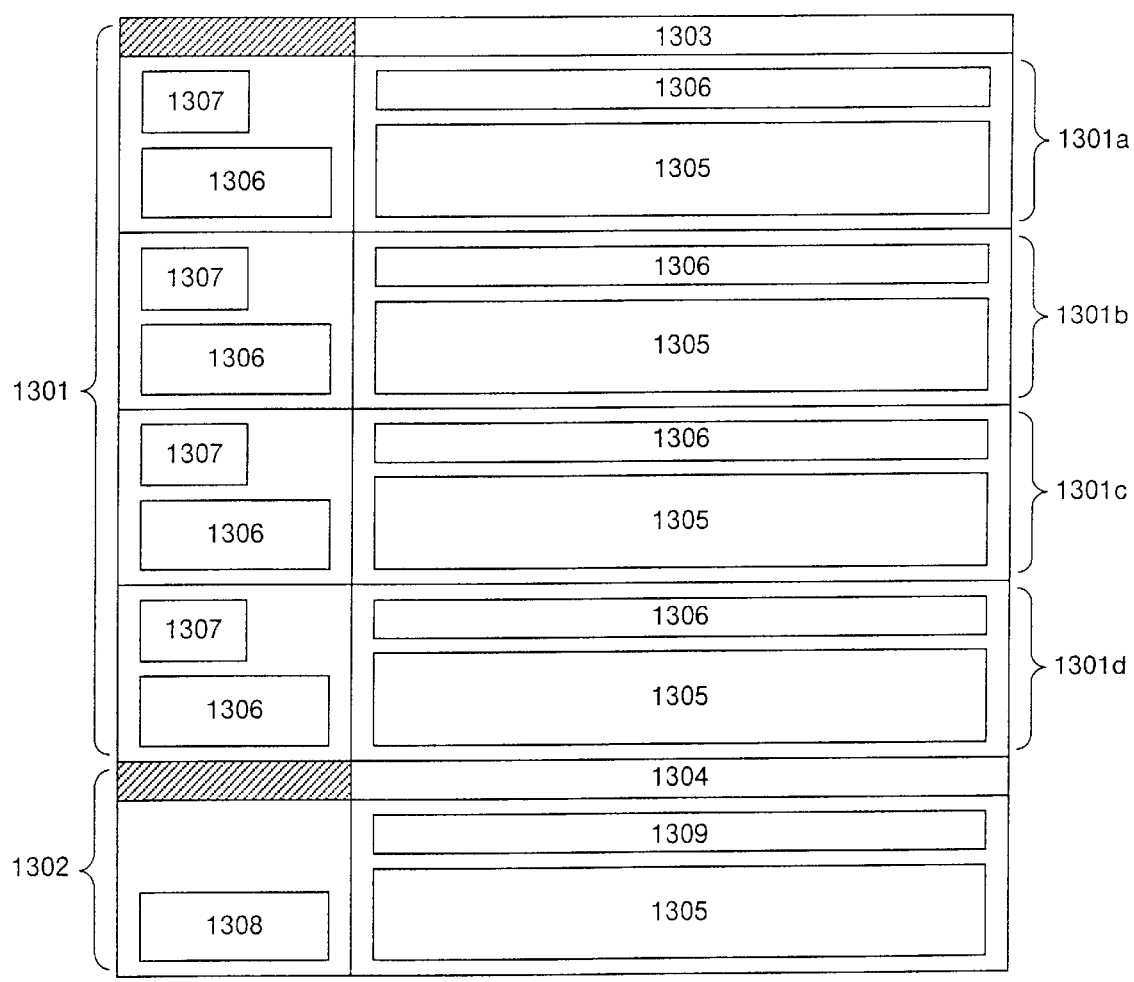
FIG. 13 is a schematic explanatory view showing a construction of a schedule view of the embodiment of the invention.

FIG. 13 is a schematic explanatory view showing a construction of a schedule view displayed by the schedule view display section 309. The window is divided into an allocated job display area 1301 and an unallocated job display area 1302. The areas are respectively provided with time scale display areas 1303 and 1304.

The allocated job display area 1301 is further divided into blocks 1301a to d for each of the printers. As shown in FIG. 13, the window is divided for each of the printers horizontally, but the window may be divided vertically. Each block comprises a job graph display area 1305, an in-process job information display area 1306 and a printer state display area 1307.

The unallocated job display area 1302 comprises a single block. The block comprises a job graph display area 1305, all-unallocated job information display area 1308 and a job information display area 1309.

Each of the job graph display areas 1305 is drawn by the job graph display section 309a. The job graph display section 309a corresponds to "display unit" and "second display unit" in claims, and processing carried out corresponds to "display step" and "second display step" in claims.

The time scale display areas 1303 and 1304 is drawn by the time scale display section 309b. The time scale display section 309b corresponds to "time scale display unit" in claims, and processing carried out by this unit corresponds to "time scale display step" in claims.

Figure 14:
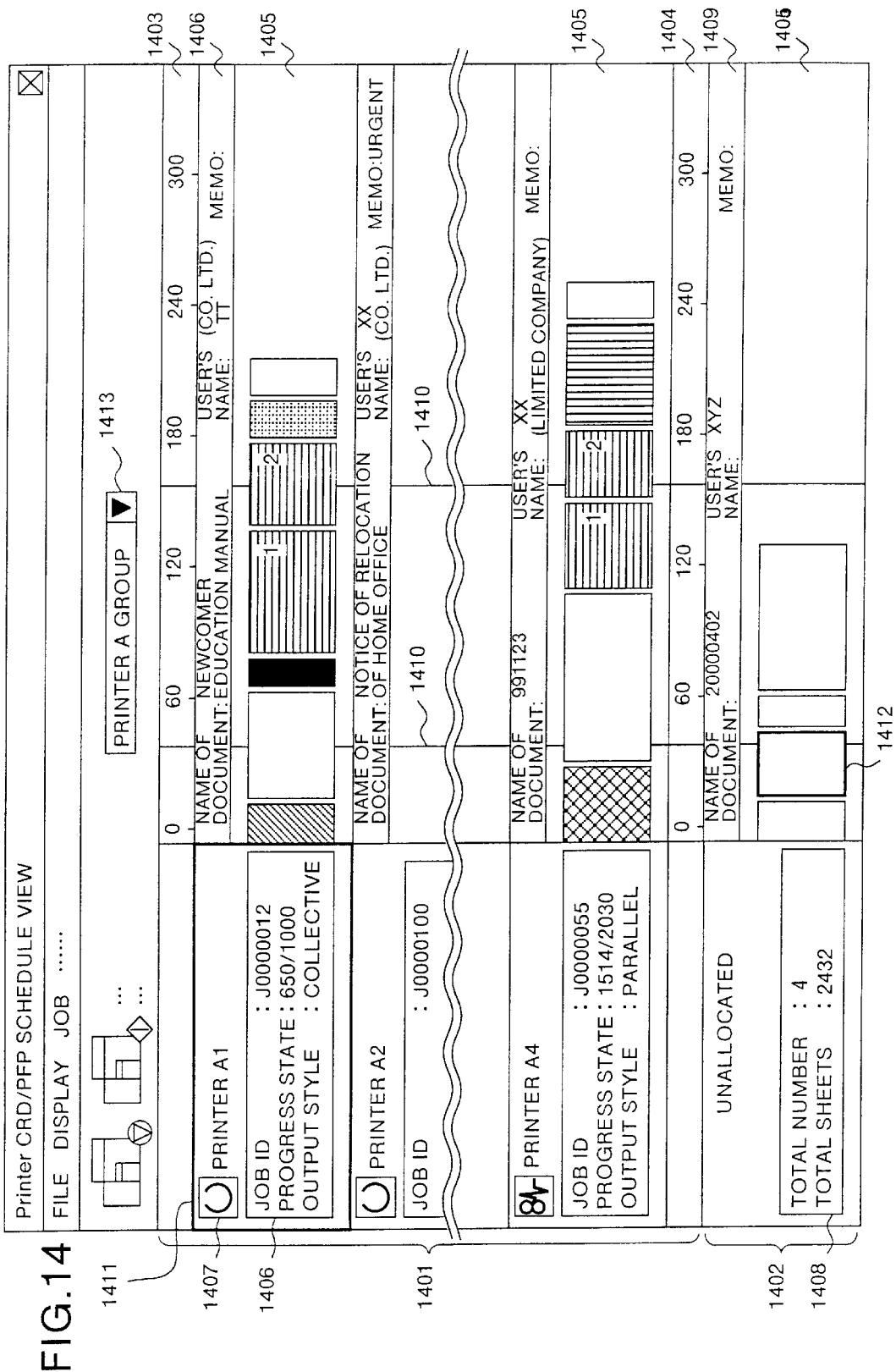
FIG. 14 is an explanatory view showing one example of the schedule view of the embodiment of the invention.

Although it is not illustrated in FIG. 13, a guide bar 1410 shown in FIG. 14 is drawn by a guide bar display section 309c. The guide bar display section 309c corresponds to "guide bar display unit" in claims, and processing carried out by this unit corresponds to "guide bar display step" and "guide bar re-display step".

The in-process job information display area 1306 is drawn by the in-process job information display section 309d. The in-process job information display section 309d corresponds to "in-process job information display unit" in claims, and processing carried out by this unit corresponds to "in-process job information display step".

The printer state display area 1307 is drawn by the printer state display section 309e. This printer state display section 309e corresponds to "printer state display unit" in claims, and processing carried out by this unit corresponds to "printer state display step".

The all-unallocated job information display area 1308 is drawn by the all-unallocated job information display section 309f, and this all-unallocated job information display section 309f corresponds to "all-unallocated job information display unit" in claims, and processing carried out by this unit corresponds to "all-unallocated job information display step" in claims.

The selected job information display area 1309 is drawn by the selected job information display section 309g. This selected job information display section 309g corresponds to "selected job information display unit" in claims, and processing carried out by this unit corresponds to "selected job information display step" in claims.

Figure 19:
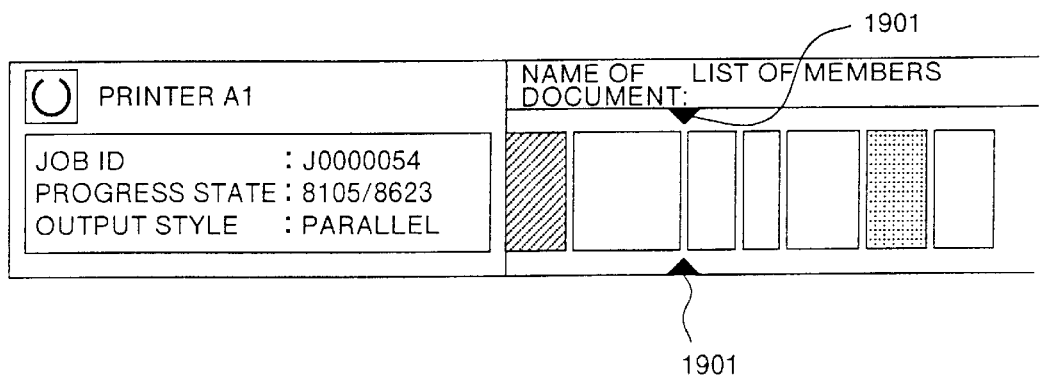
FIG. 19 is an explanatory view showing one example of an interruption position pointer of the embodiment of the invention.

Although it is not illustrated in FIG. 13, a later-described interruption position pointer 1901 in FIG. 19 is drawn by the interruption position display section 309h, this interruption position display section 309h corresponds to "interruption position display unit", and processing carried out by this unit corresponds to "interruption position display step".

FIG. 14 is an explanatory view showing one example of the schedule view displayed by the schedule view display section 309. First, in a job graph display area 1405 of each the allocated job display area 1401, jobs allocated to that printer but not completed are displayed each with a predetermined shape having a length proportional to its printing time (e.g., rectangular, and "rectangular shape" hereinafter), and are displayed in the order without leaving space. One dot gap of the same color as the background color is provided between jobs so that its boundary can easily be seen.

A bar-like rectangular shape formed by arranging the rectangular shapes of jobs allocated to the same printer at distances of one dot is called "job graph" hereinafter. Since a length of each rectangular shape is proportional to a printing time of each job, the length of each job graph is proportional to a total processing time accumulated in that printer, i.e., proportional to a load of each printer. Therefore, it is possible to grasp magnitude of a load of each printer through intuition by the length.

When a new job was input, or when a printer slated to process an existing job was determined or changed, or when a job or printer is changed in state, or when printing time was re-calculated as the printing operation proceeded, in short, when data was written or rewritten in any of tables held in the database managing section 303, the job graph display section 309a refers to each written or rewritten table, and each job graph is re-displayed (refreshed).

Since the printing time of a job which is being printed is re-calculated and gradually reduced as the printing operation proceeds, the length of the rectangular shape corresponding to that job is also shortened whenever the job graph is displayed. Since a job which is being printed is always displayed at a top of the job graph, i.e., on the side of a starting point of the later-described time scale, if the length of the top rectangular shape is shortened, subsequent rectangular shapes are moved into the starting point correspondingly. More intuitively, the job graph of each printer sequentially moves toward the top, here, leftward as the time is elapsed, and a point ahead of the starting point comes out from the screen. Therefore, the progress state of a job by each printer can intuitively be grasped by the movement of the job graph.

Figures 15, 16:
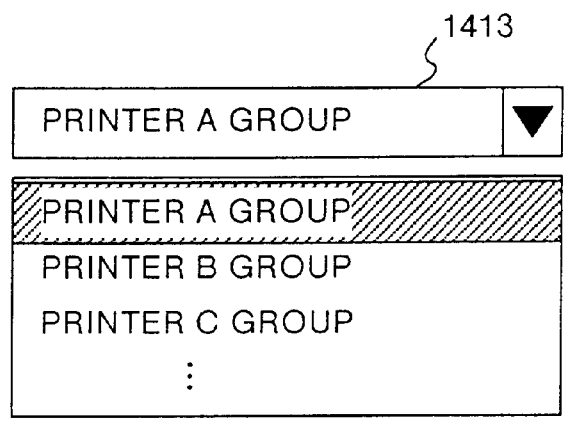
FIG. 15 is an explanatory view showing a corresponding relation between a job state and a color or pattern of a rectangular shape on the schedule view of the embodiment of the invention.
FIG. 16 is an explanatory view showing one example of switching operation of a printer group of the embodiment of the invention.

Color or pattern of each rectangular shape in the job graph shows a job state corresponding to that rectangular shape, and when the job graph is re-displayed, a new state of each job is renewed. FIG. 15 is an explanatory view showing a corresponding relation between a job state and a color or pattern of a rectangular shape.

Characters such as "1", "2" and the like shown on a right upper corner in the rectangular shape show that a job shown with the rectangular shape is a small job divided from a parent job, in other words, that job is a subject of parallel printing. Since common characters are added to small jobs divided from the same parent job, it is easy to find when a job which is to be printed in parallel by a plurality of printers by which printer.

Although the characters are indicated in the rectangular shape, the invention is not limited to this, and the characters may be indicated near the rectangular shape so that it can be found that the characters indicate the rectangular shape. The same numbers are used in this embodiment, but the invention is not limited to this, and the same characters may be used, or the same graphics or pictures such as icons may be used. Further, by indicating one of jobs divided by an icon, the other one of the divided jobs may be indicated in a different manner.

Accumulation states of jobs of a plurality of printers in a selected group, here, printers from "Printer A1" to "Printer A4" in the "Printer A" group are simultaneously displayed in the allocated job display area 1401.

In order to see an accumulation state of a job in other group, switching instructions of displayed printer groups displayed are input from the inputting section 305. More specifically, as shown in FIG. 16, a desired group is clicked by a mouse 212 from a pull-down list 1413 at an upper portion in the window. If the printer table 303c switches the group to another group by the database managing section 303 requested by the inputting section 305, each portion of the schedule view display section 309 displays an accumulation state of a job and detailed information of a job which is being processed about each printer in the newly selected group instead of the group displayed heretofore.

In the schedule view shown in FIG. 14, time scales are displayed in time scale display areas 1403 and 1404 respectively. Elapsed time from the current date and time is displayed in the time scale, and its unit is minute.

Relative magnitude of loads of the printers can be grasped by lengths of job graph even if there is no time scale, but magnitude of absolute load such as length of printing time can not be found. If a terminal end of the job graph of a printer is located "after 120 minutes" on the scale for example, it can be found that job of remaining 120 minutes is accumulated in that printer.

For example, a rectangular shape whose terminal end is located "after 300 minutes" on the scale shows a job which will be completed after 300 minutes (5 hours). Therefore, if there is a job which must be completed within that day, i.e., 17:00 that is quitting time at noon, if a user sees whether the terminal end of the rectangular shape showing that job is closer to the starting point than "after 300 minutes" on the scale, it is possible to easily judge whether the job will be completed within the deadline.

In the schedule view shown in FIG. 14, a guide bar 1410 is displayed. The guide bar 1410 passes through a point on the scale and astride a job graph in a direction perpendicular to the point. Each straight line is cut but this is due to design, and each the straight line is one line in principle.

If "guide bar display" is selected from "display menu", one guide bar 1410 is displayed. Whenever the "guide bar display" is executed, a new guide bar 1410 is displayed. Therefore, a desired number of guide bars 1410 can be set in the window. The guide bar 1410 can be moved to a desired position on the scale by the mouse 212.

The guide bar 1410 can be used variously. For example, when a job graph ending at its left side and a job graph ending at its right side are mixed, this means that jobs are not equally distributed to the printers. Therefore, it is possible to equalize the levels of loads of printers by re-allocating a job of a printer having a great load to a printer having a small load.

The guide bar 1410 can also be used for checking whether processing time periods of the jobs which are printed by a plurality of printers in parallel are varied. When some of small jobs divided from the same parent job exist on the left side of the guide bar 1410 and other small jobs exist on the right side, the processing time periods of the small jobs are varied and results of print can not be coordinated efficiently. Thus, some of jobs are re-allocated so that processing time periods of the small jobs becomes substantially the same.

The guide bar 1410 can be used for grasping whether how much time-out jobs are generated. When there exists two hours until quitting time, if the guide bar 1410 is set to "after 120 minutes", a job which lies off rightward is the time-out job. In association with this, the guide bar 1410 can be utilized for checking whether a job is completed within the deadline.

The guide bar 1410 is sequentially moved toward the starting point on the scale by the elapsed time from the setting time, and if it reached the starting point, the bar is erased. Alternatively, if the bar is set on a position of after 120 minutes on the scale, the bar may be erased after just 120 minutes. Therefore, if the guide bar 1410 is set on the terminal end of a job which a user decided to process up to here today, it is possible to grasp remaining time (a target can be achieved after 30 minutes) to achieve a target.

In the block of each printer, detailed information of a job which is being processed by each printer, more specifically, name of document, user's name, memo, job ID, progress state and an in-process job information display area 1406 for displaying output form are provided. In the drawing, an area for displaying the name of document, the user's name and the memo, and an area for displaying the job ID, the progress state and the output form are separated from each other, but this is convenient, in term of design, for keeping balance with respect to the later-described unallocated job display area 1402, and the areas may not be divided and collectively displayed.

The progress state is indicated by "the number of printed sheets"/"total number of prints" concretely.

The number of printed sheets is the number of sheets which have already been printed, and the total number of prints is obtained from "the number of copies×the number of printing pages".

The output form shows a classification of printing states, i.e., a state in which the job is collectively processed by that printer (collective print), a state in which the job is divided into a plurality of jobs, and the jobs are processed by a plurality of printers (parallel print), a state in which a job allocated to another printer is re-allocated to this printer because of a defective condition of the other printer (deputy print).

Figure 17:
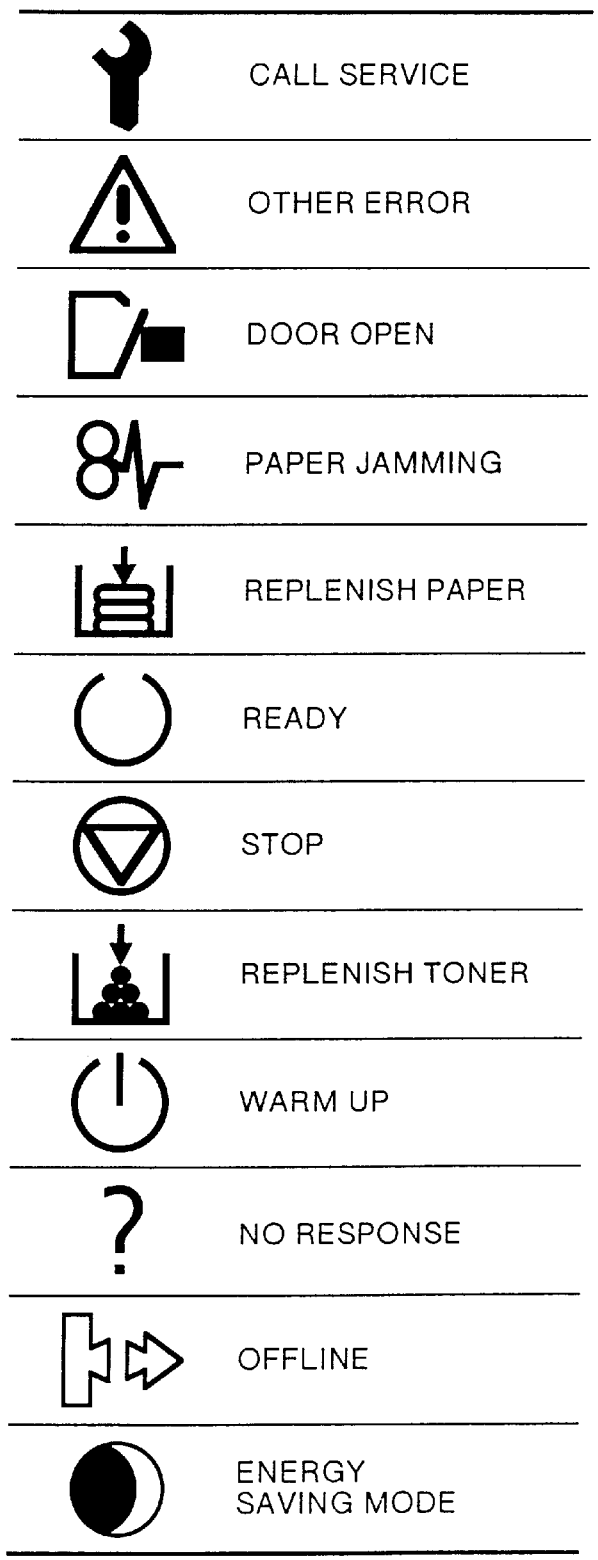
FIG. 17 is an explanatory view showing a corresponding relation between a printer state icon and a printer state of the embodiment of the invention.

The block of each printer is provided with a printer state display area 1407 showing a state of the printer. In the area, a current state of the printer is displayed with a predetermined icon. FIG. 17 is an explanatory view showing a corresponding relation between a printer state icon and a printer state.

Explanation of meaning of each state is omitted, but only "STOP" will be explained. The "STOP" icon is displayed when a job which is designated to be stopped comes, and when an operator stops the operation of a printer by means of an operation panel or a print server of the printer. This is different from giving a stop attribute to the job, and directly gives stop instructions to the printer.

Figure 18:
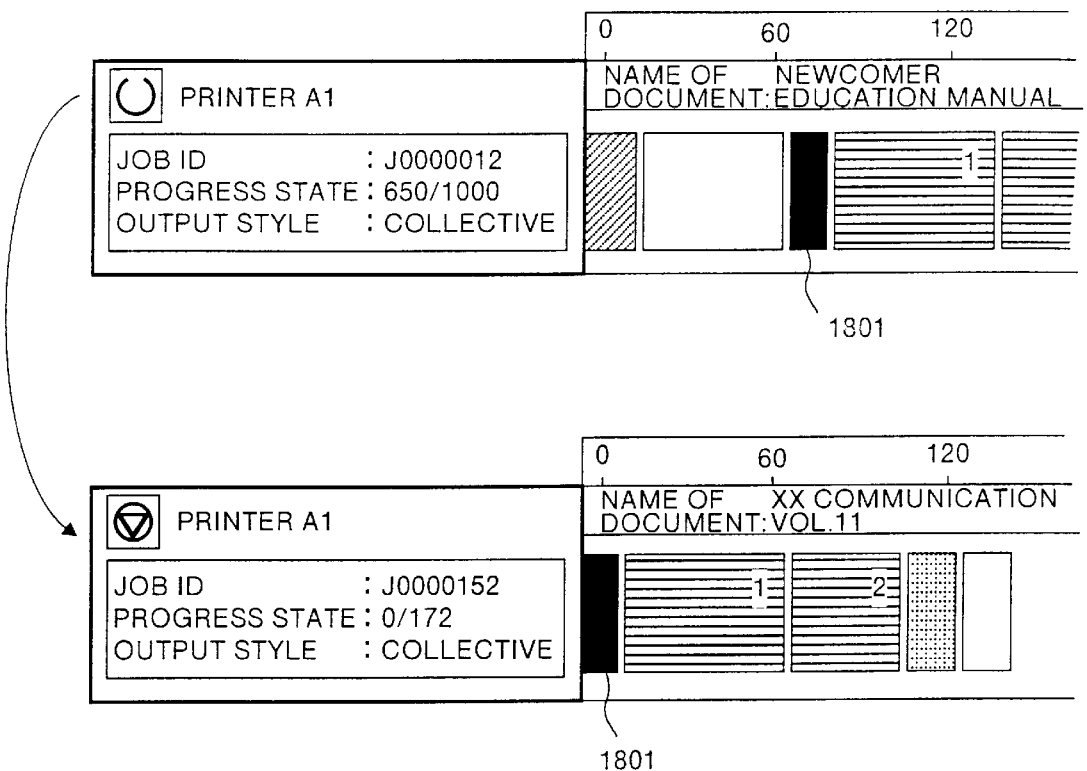
FIG. 18 is an explanatory view showing a screen state (a portion thereof) when the printer state icon is changed from "READY" to "STOP"

FIG. 18 is an explanatory view showing a screen state (a portion thereof) when the printer state icon is changed from "READY" to "STOP". A stopped job 1801 moves toward the starting point on the scale as time elapses, and its tip end coincides with the starting point, the printer state icon is renewed to the lower "STOP" to the upper "READY". When the tip end coincided with the starting point, the processing time of the job approached.

A job which is being processed includes a job which is being printed of course, and a job causing error during the printing operation, and a job which is stopped by stopping instructions although the printing time has come. More intuitively, the job which is being processed is a job located at the top of the job graph of each printer.

In FIG. 14, in-process job information display area 1406 (a portion thereof) and the printer state display area 1407 of "Printer A1" are surrounded by navy blue two dot frame line 1411, and this indicates that this printer is currently selected (the "selected printer" is different from "selected group"). It is possible to instruct the selected printer to stop or restart from upper icon and the like of the window.

Jobs which are not allocated to any of the printers are arranged in the input order and displayed in the job graph display area 1405 in the unallocated job display area 1402. Like the allocated jobs, a length of the rectangular shape indicates printing time calculated for the job, color or pattern of the rectangular shape indicates a current state of the job (more specifically, a state in which the job is not allocated to a printer), and a length of the job graph indicates total time required for processing all the unallocated jobs.

In the unallocated job display area 1402, there are provided an all-unallocated job information display area 1408 for displaying the total number of unallocated jobs and a total number of prints, and a selected job information display area 1409 for displaying name of document, user's name and memo (comment) of unallocated job.

In order to allocate an unallocated job to any of the printers, a selection instructions of a job and allocation instructions to the job's printer are input from the inputting section 305. More specifically, a jot to be allocated to a printer is clicked by the mouse 212 first. The job selected in this manner is highlighted and displayed with navy blue one dot frame line 1412.

Next, "printer allocation" is selected and executed from the upper pull-down menu of the window. When the printer allocation was executed from the menu in this manner, the printer allocating section 307 which received instructions from the inputting section 305 adds, in principle, a selected job to the last of print-waiting line of printers which has lowest load, i.e., which can start the job fastest at this point in time.

However, when it is not desired to allow a printer capable of starting the job fastest to do so, but when it is necessary to allow a particular printer to do the job before a particular job, the job can be put between desired jobs of a desired printer by clicking the job to drag and drop as it is.

A boundary between jobs is clear by the one dot gap as described above. In order to clearly show which side of the boundary the job is put at the time of drag and drop of the job, an interruption position pointers 1901 as shown in FIG. 19 on the gap nearest the mouse cursor in principle. As the mouse cursor moves, the pointers also move.

Each job is previously provided with precedence, a job can interrupt when the job has the same or higher precedence as or than that of an interrupted job. Therefore, the interruption position pointer 1901 is not displayed in the gap when there is any job having higher precedence behind a gap nearest the mouse cursor and interruption of job having lower precedence is prohibited. In this case, a job nearest the mouse cursor is selected from jobs in the boundary which can be interrupted, and the interruption position pointer 1901 is displayed in that position.

When a job interrupted by drag and drop, the printer allocating section 307 which was informed by the inputting section 305 requests the printing time calculating section 306 to re-calculate the printing time of the selected job using the printing speed of the interrupting printer. Then, the printer allocating section 307 requests the database managing section 303 to write the printer slated to process the job as the interrupting printer, and the printing time as the printing time in the print schedule table 303b.

The Web interface 301, the document managing server interface 302, the database managing section 303, the printer interface 304, the inputting section 305, the printing time calculating section 306, the printer allocating section 307, the main view display section 308 and the schedule view display section 309 realize functions thereof if the CPU 201 executes the instructed processing in accordance with instructions described in program stored in the storage medium such as the ROM202, the RAM203, the HD205 or FD207.

Figure 20:
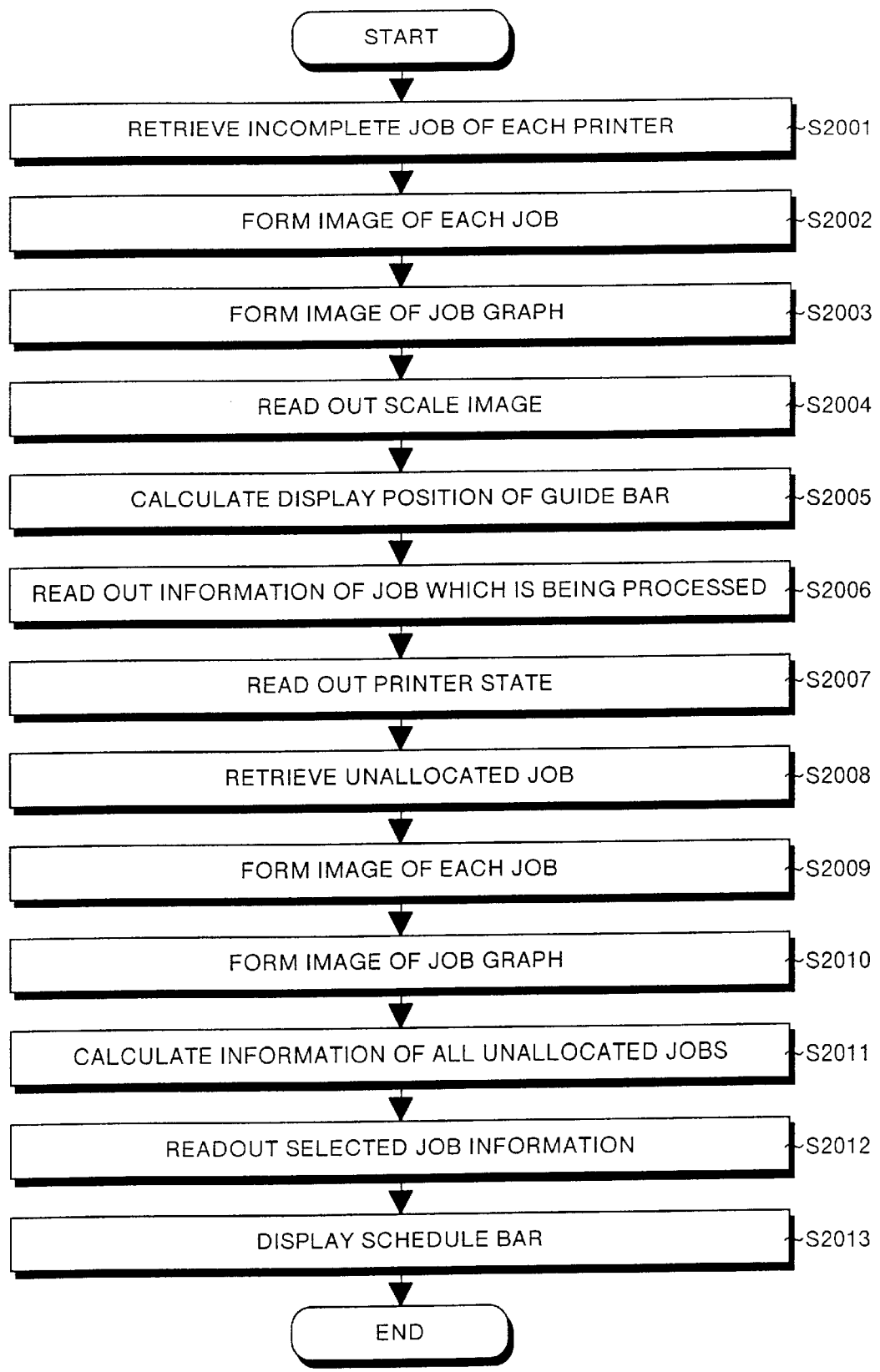
FIG. 20 is a flowchart showing procedure of schedule view display processing of the print server 105 of the embodiment of the invention.

Next, procedure of display processing of schedule view of the printer controlling device (print server 105) according to the embodiment of the present invention will be explained. FIG. 20 is a flowchart showing procedure of schedule view display processing of the print server 105 of the embodiment of the invention. When the schedule view icon 1204 was pushed on the main view shown in FIG. 12, the processing of this flowchart is started.

In step S2001, the job graph display section 309a of the schedule view display section 309 requests the database managing section 303 to retrieve all jobs slated to be completed after the current date and time in each printer in the selected group.

In step S2002, lengths of the rectangular shapes showing respective jobs are calculated from the printing time of jobs held by the print schedule table 303b. For example, when 1 minute on the scale is 4 dots and the printing time of the job is 120 minutes, calculation is carried out in the following manner: 4 dots×120 minutes−1 dot of gap=479 dots. If this equation is used, when the screen is enlarged, the gap of the job is also enlarged, and it is possible to avoid a problem that outer appearance is inferior.

From the state of each job held by the print schedule table 303b, color or pattern of the rectangular shape showing the job is determined. Referring to the job ID, if there are small jobs divided from the same parent job, these small jobs are provided with the same characters. A rectangular image showing each job is formed from the length, the color or the pattern, and the character.

In step S2003, images of the jobs formed in step S2002 are connected to each other through a distance of one dot for each allocated printer, thereby forming an image of the job graph for each printer.

In step S2004, the time scale display section 309b of the schedule view display section 309 reads out an image of the previously held time scale from a storage section (not shown).

In step S2005, the guide bar display section 309c of the schedule view display section 309 judges whether the guide bar 1410 is set or not from a table (not shown) held in the guide bar display section 309c. If the guide bar 1410 is set, its setting date and time held in the above table and its setting position on the scale are read out. Then, a new display position on the scale is calculated based on the elapsed time from the setting date and time to the current date and time.

For example, if the "guide bar display" is selected from the "display"menu and the guide bar 1410 displayed in an arbitrary position was moved to a position after 60 minutes on the scale at 11:00, and the current time is 11:10, the elapsed time (10 minutes) from the setting date and time is subtracted the setting position (after 60 minuets), and a new display position is calculated as "after 50 minuets".

In step S2006, the in-process job information display section 309d of the schedule view display section 309 requests the database managing section 303 to read out a name of document, a user's name, a memo, a job ID, the number of copies, the number of printing pages and the output form of a job which are being processed from the print-job table 303a. The read out number of copies is multiplied by the number of printing pages to obtain the total number of prints which are being processed.

In step S2007, the printer state display section 309e of the schedule view display section 309 requests the database managing section 303 to read out a state of each printer in the selected group from the printer table 303c. Images of icons corresponding to the read out states are read out from the storage section (not shown).

In step S2008, the job graph display section 309a of the schedule view display section 309 requests the database managing section 303 to retrieve all the jobs which are not allocated to the printers from the print schedule table 303b. Then, in step S2009, length, color or pattern of the rectangular shape showing each job are determined from the printing time and the state in the print schedule table 303b, thereby forming the image.

Further, in step S2010, the order of the rectangular shapes formed in step S2009 is determined in accordance with the input date and time of each job held in the print-job table 303a, and the rectangular shapes are connected in this order at a distance of one dot, thereby forming an image of the job graph of the unallocated job.

In step S2011, the all-unallocated job information display section 309f of the schedule view display section 309 counts the total number of unallocated jobs retrieved in step S2008, and requests the database managing section 303 to read out the number of copies and the number of printing pages from the print-job table 303a. Then, the number of prints (=the number of copies×the number of printing pages) of each job is accumulated to calculate out the total number of prints of the unallocated jobs.

In step S2012, if there is a selected unallocated job among the unallocated jobs, the selected job information display section 309g of the schedule view display section 309 requests the database managing section 303 to read out a name of document, a user's name and a memo from the print-job table 303a.

In step S2013, each of the above sections inserts the images formed in the above steps, read out character information, the calculated numerical values and the like into a previously prepared image of the schedule view to show them on the screen. Thereafter, the processing of this flowchart is completed.

As explained above, according to this embodiment, since loads of the printers are displayed graphically by the job graph, it is possible to intuitively grasp whether the loads are appropriately distributed to the printers. Further, since the scale is also displayed, it is possible to grasp not only the absolute value of the load of each printer, but also the absolute amount (absolute amount converted into the printing time).

Further, since each the rectangular shape in the job graph shows the state of job by color or pattern of the rectangular shape, it is possible to intuitively grasp the size, the state of the input job, and the order of the jobs. Further, it is easy to find when a particular job is processed by the scale and thus, it is easy to manage the deadline of the jobs.

The total amount of the current jobs of each printer, the total amount of unallocated jobs, the current states of each job and each printer, jobs which are currently being processed, and the details of the selected job are displayed easily for an operator in real time. Therefore, it is possible to grasp current and future operating status of the entire system at a glance.

The printer controlling method explained in the above embodiment is realized by storing the program in a computer-readable storage medium such a ROM, a HD, a FD, a CD-ROM, an MO, a DVD, an IC card, and by reading out the program from the medium by a computer. This program can be distributed as a transfer medium through the above storage medium or through a network such as Internet.

As explained above, according to the printer controlling device and printer controlling method of the present invention, an accumulation state of a job to each printer is displayed in a form of the job graph comprising all jobs accumulated in the printer. Therefore, there is an effect that it is possible to obtain a printer controlling device capable of displaying load states of the printers in an easy-to-understand manner graphically.

Furthermore, the accumulation state of each printer belonging to the same group is displayed in the form of the job graph comprising all jobs accumulated in the printer. Therefore, there is an effect that it is possible to obtain a printer controlling device capable of displaying the load state of the printers in a group in the easy-to-understand manner graphically.

Moreover, the accumulation state of a latest job to each printer is always reflected to the job graph. Therefore, there is an effect that it is possible to obtain a printer controlling device capable of displaying the load state of the printers at various time in the easy-to-understand manner graphically and in real time.

Furthermore, the state of job in the job graph is displayed with color or pattern of corresponding predetermined shape. Therefore, there is an effect that it is possible to obtain a printer controlling device capable of displaying the states of jobs accumulated in the printers in the easy-to-understand manner graphically and in real time.

Moreover, the same characters of a corresponding predetermined shape is disposed in each job which as divided and distributed by a parallel printing function. Therefore, there is an effect that it is possible to obtain a printer controlling device capable of displaying the relation of the plurality of jobs processed by the plurality of printers in the easy-to-understand manner.

Furthermore, a job amount and the entire amount accumulated in each printer is displayed with an absolute amount converted into the printing time. Therefore, there is an effect that it is possible to obtain a printer controlling device capable of converting the load states of the printers into the printing time and displaying the same in the easy-to-understand manner.

Moreover, the guide bar capable of being used for various purposes such as averaging of load states of the printers. Therefore, there is an effect that it is possible to obtain a printer controlling device capable of easily averaging the load states of the printers.

Furthermore, the guide bar moves in an opposite direction on the scale by an amount corresponding to the elapsed time. Therefore, there is an effect that it is possible to obtain a printer controlling device capable of easily grasping the remaining time to achieve a target.

Moreover, detailed information of the job which is being processed by a printer is displayed in addition to the accumulation state of the job to the printer. Therefore, there is an effect that it is possible to obtain a printer controlling device capable of displaying, in the easy-to-understand manner, which the currently processed job is.

Furthermore, detailed information of the job which is being processed by each printer, i.e., at least one of the name of document, the user's name, the memo, the job ID, the progress state and the output form is displayed in addition to the accumulation state of the job to the printer. Therefore, there is an effect that it is possible to obtain a printer controlling device capable of displaying the load state of the printers in the easy-to-understand manner graphically, and which the currently processed job is.

Moreover, the accumulation state of the job to the printer and detailed information of the job which is being processed by the printer are displayed side-by-side. Therefore, there is an effect that it is possible to obtain a printer controlling device capable of collectively displaying the accumulation state of the job to the printer and the detailed information of the job processed by the printer in one place.

Furthermore, it is clearly indicated by the icon that a stop of a printer is not due to trouble but due to suspending job. Therefore, there is an effect that it is possible to obtain a printer controlling device capable of displaying a cause of suspension of a printer in the easy-to-understand manner.

Moreover, the accumulation state of a job which is not yet allocated to a printer is displayed in a form of the job graph comprising all unallocated jobs. Therefore, there is an effect that it is possible to obtain a printer controlling device capable of displaying the total amount of jobs which are not allocated to the printer in the easy-to-understand manner graphically.

Furthermore, the total number of unallocated jobs and the total number of prints are clearly indicated by means of numerical values in addition to the job graph. Therefore, there is an effect that it is possible to obtain a printer controlling device capable of displaying the total amount of jobs which are not yet allocated to the printers in the easy-to-understand manner, and displaying with strict numerical value with the total number and the total number of prints.

Moreover, the accumulation state of the unallocated jobs, its total number and the total number of prints are displayed side-by-side. Therefore, there is an effect that it is possible to obtain a printer controlling device capable of collectively displaying the accumulation state of the unallocated jobs and the total number and the total number of prints in one place.

Furthermore, detailed information of a selected job among the unallocated jobs is displayed together with the job graph. Therefore, there is an effect that it is possible to obtain a printer controlling device capable of displaying the total amount of jobs which are not yet allocated to the printers in the easy-to-understand manner graphically, and displaying which the currently selected job is.

Moreover, detailed information of the selected job among the unallocated jobs, i.e., at least one of the name of document, the user's name, the memo, is displayed in addition to the job graph. Therefore, there is an effect that it is possible to obtain a printer controlling device capable of displaying the total amount of jobs which are not yet allocated to the printers in the easy-to-understand manner graphically, and displaying which the currently selected job is.

Furthermore, the accumulation state of the unallocated job and detailed information of the selected job are displayed side-by-side. Therefore, there is an effect that it is possible to obtain a printer controlling device capable of collectively displaying the accumulation state of the unallocated jobs and detailed information of the selected job in one place.

In addition, the interruption position pointer clearly indicates which selected job interrupts between which jobs. Therefore, there is an effect that it is possible to obtain a printer controlling device capable of displaying the interruption position of the selected job in the easy-to-understand manner.

The present document incorporates by reference the entire contents of Japanese priority document, 2000-344135 filed in Japan on Nov. 10, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A printer controlling device which displays a load state of at least one of a plurality of printers connected through a network, said printer controlling device comprising:
    an allocating unit adapted to allocate a first print-job to a first printer of a first printer group,
    a calculating unit adapted to calculate a time required for the first printer to process the first print-job, and
    a display unit adapted to display the first print-job by a first predetermined shape having a length proportional to the time calculated by said calculating unit, and adapted to display a second predetermined shape corresponding to a second print-job allocated to a second printer of the first printer group.

2. The printer controlling device according to claim 1, wherein said display unit updates a display contents after a constant time is elapsed.

3. The printer controlling device according to claim 1, wherein said display unit displays the first print-job with one of a color or pattern corresponding to a state of the first print-job.

4. The printer controlling device according to claim 1, further comprising:
    a time scale display unit adapted to display a time scale in which elapsed time from a current date and time is disposed in a direction parallel to the first predetermined shape.

5. The printer controlling device according to claim 1, further comprising:
    an in-process job information display unit adapted to display information of the first print-job.

6. The printer controlling device according to claim 5, wherein the information comprises at least one of a name of document, a user's name, a memo, a job ID, a progress state and an output form.

7. The printer controlling device according to claim 5, wherein said in-process job information display unit is adapted to display the information adjacent the first predetermined shape.

8. A printer controlling device which displays a load state of at least one of a plurality of printers connected through a network, said printer controlling device comprising:
    an allocating unit which allocates a print-job to any of the printers,
    a calculating unit which calculates time required for the printer to which the print-job was allocated by said allocating unit which processes the print-job, and
    a display unit which displays the print-job by a predetermined shape having a length which is proportional to the time calculated by said calculating unit, and which arranges predetermined shapes corresponding to all print-jobs allocated to said printer by said allocating unit and not completed at a constant distance in a horizontal direction or a vertical direction in association with individual printers, wherein in order to display printers belonging to a same group of a plurality of groups, said display unit arranges and displays the predetermined shapes corresponding to all the print-jobs which are allocated to the printer by said allocating unit and not yet completed in association with individual printers belonging to the same group at the constant distance from one another in a horizontal direction or a vertical direction.

9. A printer controlling device which displays a load state of at least one of a plurality of printers connected through a network, said printer controlling device comprising:

an allocating unit which allocates a print-job to any of the printers, a calculating unit which calculates time required for the printer to which the print-job was allocated by said allocating unit which processes the print-job, and a display unit which displays the print-job by a predetermined shape having a length which is proportional to the time calculated by said calculating unit, and which arranges predetermined shapes corresponding to all print-jobs allocated to said printer by said allocating unit and not completed at a constant distance in a horizontal direction or a vertical direction in association with individual printers, wherein said display unit displays a print-job divided from the same print-job with a predetermined shape having a length which is proportional to time calculated by said calculating unit, and arranges and displays a same picture or a same color including a same character including symbol, figure or icon in or near the predetermined shape.

10. A printer controlling device which displays a load state of at least one of a plurality of printers connected through a network, said printer controlling device comprising:

an allocating unit which allocates a print-job to any of the printers, a calculating unit which calculates time required for the printer to which the print-job was allocated by said allocating unit which processes the print-job, a display unit which displays the print-job by a predetermined shape having a length which is proportional to the time calculated by said calculating unit, and which arranges predetermined shapes corresponding to all print-jobs allocated to said printer by said allocating unit and not completed at a constant distance in a horizontal direction or a vertical direction in association with individual printers, a time scale display unit which displays a time scale in which elapsed time from the current date and time is disposed in a direction parallel to a predetermined shape arranged and displayed by said display unit, and a guide bar display unit which displays at least one straight line which passes through any of the predetermined shapes arranged and displayed by any of the elapsed time of the time scale and said display unit in a direction perpendicular to the time scale displayed by said time scale display unit.

11. The printer controlling device according to claim 10, wherein said guide bar display unit moves said guide bar in a direction of a starting point of said time scale by an amount corresponding to the elapsed time whenever a constant time is elapsed.

12. A printer controlling device which displays a load state of at least one of a plurality of printers connected through a network, said printer controlling device comprising:

an allocating unit which allocates a print-job to any of the printers, a calculating unit which calculates time required for the printer to which the print-job was allocated by said allocating unit which processes the print-job, a display unit which displays the print-job by a predetermined shape having a length which is proportional to the time calculated by said calculating unit, and which arranges predetermined shapes corresponding to all print-jobs allocated to said printer by said allocating unit and not completed at a constant distance in a horizontal direction or a vertical direction in association with individual printers, and a printer state display unit which displays an icon indicative of stop of a printer whose predetermined shape was displayed in association when a state of a print-job corresponding to a top print-job among those having a predetermined shape and arranged and displayed by said display unit.

13. A printer controlling device which displays a load state of at least one of a plurality of printers connected through a network, said printer controlling device comprising:

an allocating unit which allocates a print-job to any of the printers, a calculating unit which calculates time required for the printer to which the print-job was allocated by said allocating unit which processes the print-job, a display unit which displays the print-job by a predetermined shape having a length which is proportional to the time calculated by said calculating unit, and which arranges predetermined shapes corresponding to all print-jobs allocated to said printer by said allocating unit and not completed at a constant distance in a horizontal direction or a vertical direction in association with individual printers, a second calculating unit which calculates time required for processing a print-job which is not yet allocated to any of the printers by said allocating unit, and a second display unit which displays the print-job not yet allocated to any of the printers with a predetermined shape having a length which is proportional to time calculated by said second calculating unit, and arranges predetermined shapes corresponding to all print-jobs not yet allocated to any of the printers at a constant distance from each other in the horizontal direction or the vertical direction, and displays the predetermined shapes corresponding to all print-jobs not yet allocated to any of the printers in a display region different from the predetermined shape display region arranged and displayed by said display unit.

14. The printer controlling device according to claim 13, further comprising an all-unallocated job information display unit which displays a total number of print-jobs and its total number of prints which are not allocated to any of the printers by said allocating unit.

15. The printer controlling device according to claim 14, wherein said all-unallocated job information display unit displays the total number and total number of prints in a display region adjacent to display regions of predetermined shape arranged and displayed by said second display unit.

16. The printer controlling device according to claim 14, further comprising a selected-job information display unit which displays information of a selected print-job among print-jobs which are not yet allocated to any of the printers by said allocating unit.

17. The printer controlling device according to claim 16, wherein the information is at least one of a name of document, a user's name and a memo of a selected print-job.

18. The printer controlling device according to claim 16, wherein said selected job information display unit displays the information in a display region adjacent to display regions of predetermined shape arranged and displayed by said second display unit.

19. A printer controlling device which displays a load state of at least one of a plurality of printers connected through a network, said printer controlling device comprising:

an allocating unit which allocates a print-job to any of the printers, a calculating unit which calculates time required for the printer to which the print-job was allocated by said allocating unit which processes the print-job, a display unit which displays the print-job by a predetermined shape having a length which is proportional to the time calculated by said calculating unit, and which arranges predetermined shapes corresponding to all print-jobs allocated to said printer by said allocating unit and not completed at a constant distance in a horizontal direction or a vertical direction in association with individual printers, a designating unit which designates an interruption position of a selected print-job, and an interruption position display unit which displays an interruption position pointer between two predetermined shapes displayed nearest an interruption position designated by said designating unit.

20. A printer controlling method of displaying a load state of at least one of a plurality of printers connected through a network, the printer controlling method comprising:

allocating a first print-job to a first printer of a first printer group;

calculating a time required for the first printer to process the first print-job; and displaying the first print-job with a first predetermined shape having a length proportional to the calculated time; and displaying a second predetermined shapes corresponding to a second print-job allocated to a second printer of the first printer group.

21. The printer controlling method according to claim 20, further comprising:

renewing contents displayed after a constant time is elapsed.

22. The printer controlling method according to claim 20, wherein displaying the first print-job comprises displaying the first print-job with one of a color or pattern corresponding to a state of the first print-job.

23. The printer controlling method according to claim 20, further comprising:

displaying a time scale in which elapsed time from a current date and time is disposed in a direction parallel to the first predetermined.

24. The printer controlling method according to claim 20, further comprising:

displaying information of the first print-job.

25. The printer controlling method according to claim 24, wherein the information comprises at least one of a name of document, a user's name, a memo, a job ID, a progress state and an output form.

26. The printer controlling method according to claim 24, wherein displaying information of the first-print job comprises displaying the information adjacent to the first predetermined shape.

27. A printer controlling method of displaying a load state of at least one of a plurality of printers connected through a network, the printer controlling method comprising:

an allocating step of allocating a print-job to any of the printers;

a calculating step of calculating time required for a printer to which the print-job is allocated at the allocating step for processing the print-job; and a display step of displaying the print-job with a predetermined shape having a length which is proportional to time calculated at the calculating step, arranging and displaying predetermined shapes respectively corresponding to all print-jobs which are allocated to the printers at the allocating step but are not yet completed, in association with individual printers, wherein at the display step, the predetermined shapes respectively corresponding to all the print-jobs which are allocated to the printer but not yet completed are arranged and displayed at a constant distance from each other in a horizontal direction or a vertical direction in association with printers belonging to a same group among a plurality of groups.

28. A printer controlling method of displaying a load state of at least one of a plurality of printers connected through a network, the printer controlling method comprising:

an allocating step of allocating a print-job to any of the printers;

a calculating step of calculating time required for a printer to which the print-job is allocated at the allocating step for processing the print-job; and a display step of displaying the print-job with a predetermined shape having a length which is proportional to time calculated at the calculating step, arranging and displaying predetermined shapes respectively corresponding to all print-jobs which are allocated to the printers at the allocating step but are not yet completed, in association with individual printers, wherein at the display step, a print-job divided from the same print-job is displayed with a predetermined shape having a length which is proportional to time calculated at the calculating step, and a same picture or a same color including a same character including symbol, figure or icon are arranged and displayed in or near the predetermined shape.

29. A printer controlling method of displaying a load state of at least one of a plurality of printers connected through a network, the printer controlling method comprising:

an allocating step of allocating a print-job to any of the printers;

a calculating step of calculating time required for a printer to which the print-job is allocated at the allocating step for processing the print-job;

a display step of displaying the print-job with a predetermined shape having a length which is proportional to time calculated at the calculating step, arranging and displaying predetermined shapes respectively corresponding to all print-jobs which are allocated to the printers at the allocating step but are not yet completed, in association with individual printers;

a time scale display step of displaying a time scale in which elapsed time from the current date and time is disposed in a direction parallel to a predetermined shape arranged and displayed in the display step; and a guide bar display step of displaying at least one straight line which passes through any of the predetermined shapes of any of the elapsed time of the time scale arranged and displayed at the display step in a direction perpendicular to the time scale displayed at the time scale display step.

30. The printer controlling method according to claim 29, further comprising a guide bar re-display step of moving said guide bar in a direction of a starting point of said time scale by an amount corresponding to the elapsed time whenever a constant time is elapsed.

31. A printer controlling method of displaying a load state of at least one of a plurality of printers connected through a network, the printer controlling method comprising:

an allocating step of allocating a print-job to any of the printers;

a calculating step of calculating time required for a printer to which the print-job is allocated at the allocating step for processing the print-job;

a display step of displaying the print-job with a predetermined shape having a length which is proportional to time calculated at the calculating step, arranging and displaying predetermined shapes respectively corresponding to all print-jobs which are allocated to the printers at the allocating step but are not yet completed, in association with individual printers; and a printer state display step of displaying an icon indicative of stop of a printer whose predetermined shape was displayed in association when a state of a print-job corresponding to a top print-job among those having a predetermined shape and arranged and displayed at the display step.

32. A printer controlling method of displaying a load state of at least one of a plurality of printers connected through a network, the printer controlling method comprising:

an allocating step of allocating a print-job to any of the printers;

a calculating step of calculating time required for a printer to which the print-job is allocated at the allocating step for processing the print-job;

a display step of displaying the print-job with a predetermined shape having a length which is proportional to time calculated at the calculating step, arranging and displaying predetermined shapes respectively corresponding to all print-jobs which are allocated to the printers at the allocating step but are not yet completed, in association with individual printers;

a second calculating step of calculating time required for processing a print-job which is not yet allocated to any of the printers at the allocating step; and a second display step of displaying the print-job not yet allocated to any of the printers with a predetermined shape having a length which is proportional to time calculated at the second calculating step, arranging predetermined shapes corresponding to all print-jobs not yet allocated to any of the printers at a constant distance from each other in the horizontal direction or the vertical direction, and displaying the predetermined shapes corresponding to all print-jobs not yet allocated to any of the printers in a display region different from the predetermined shape display region arranged and displayed at the display step.

33. The printer controlling method according to claim 32, further comprising an all-unallocated job information display step of displaying a total number of print-jobs and its total number of prints which are not allocated to any of the printers at the allocating step.

34. The printer controlling method according to claim 33, wherein the all-unallocated job information display step displays the total number and total number of prints in a display region adjacent to display regions of predetermined shape arranged and displayed at the second display step.

35. The printer controlling method according to claim 32, further comprising a selected-job information display step of displaying information of a selected print-job among print-jobs which are not yet allocated to any of the printers at the allocating step.

36. The printer controlling method according to claim 35, wherein the information is at least one of a name of document, a user's name and a memo of a selected print-job.

37. The printer controlling method according to claim 35, wherein the selected job information display step displays the information in a display region adjacent to display regions of predetermined shape arranged and displayed at the second display step.

38. A printer controlling method of displaying a load state of at least one of a plurality of printers connected through a network, the printer controlling method comprising:

an allocating step of allocating a print-job to any of the printers;

a calculating step of calculating time required for a printer to which the print-job is allocated at the allocating step for processing the print-job;

a display step of displaying the print-job with a predetermined shape having a length which is proportional to time calculated at the calculating step, arranging and displaying predetermined shapes respectively corresponding to all print-jobs which are allocated to the printers at the allocating step but are not yet completed, in association with individual printers;

a designating step of designating an interruption position of a selected print-job; and an interruption position display step of displaying an interruption position pointer between two predetermined shapes displayed nearest an interruption position designated at the designating step.

39. A computer program for causing a computer to perform a printer controlling method of displaying a load state of at least one of a plurality of printers connected through a network, the printer controlling method comprising:

allocating a first print-job to a first printer of a first printer group;

calculating a time required for the first printer to process the first print-job; and displaying the print-job with a first predetermined shape having a length proportional to the calculated time; and displaying a second predetermined shapes corresponding to a second print-job allocated to a second printer of the first printer group.

* * * * *